(12) United States Patent
Huang et al.

(10) Patent No.: US 12,424,893 B2
(45) Date of Patent: Sep. 23, 2025

(54) MOTOR, MOTOR COOLING SYSTEM, AND ELECTRIC VEHICLE

(71) Applicant: Huawei Digital Power Technologies Co., Ltd., Shenzhen (CN)

(72) Inventors: Jianxin Huang, Shenzhen (CN); Jun Chen, Dongguan (CN); Quanming Li, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 314 days.

(21) Appl. No.: 18/063,890

(22) Filed: Dec. 9, 2022

(65) Prior Publication Data

US 2023/0107455 A1   Apr. 6, 2023

Related U.S. Application Data

(63) Continuation of application No. PCT/CN2021/085312, filed on Apr. 2, 2021.

(30) Foreign Application Priority Data

Jun. 28, 2020 (CN) .................. 202010602306.X

(51) Int. Cl.
*H02K 1/32* (2006.01)
*H02K 9/19* (2006.01)
*B60K 1/00* (2006.01)

(52) U.S. Cl.
CPC .............. *H02K 1/32* (2013.01); *H02K 9/19* (2013.01); *B60K 1/00* (2013.01); *B60K 2001/006* (2013.01)

(58) Field of Classification Search
CPC ............... H02K 9/19; H02K 1/32; H02K 9/12
USPC .................... 310/52, 54, 58, 61, 62
See application file for complete search history.

(56) References Cited

U.S. PATENT DOCUMENTS

| | | | |
|---|---|---|---|
| 8,169,110 B2 | 5/2012 | Swales et al. | |
| 8,970,074 B2 | 3/2015 | Wagner et al. | |
| 2010/0045125 A1 | 2/2010 | Takenaka et al. | |
| 2010/0194220 A1* | 8/2010 | Tatematsu | H02K 1/32 310/61 |
| 2011/0273040 A1 | 11/2011 | Chamberlin et al. | |

(Continued)

FOREIGN PATENT DOCUMENTS

| | | |
|---|---|---|
| CN | 103843232 A | 6/2014 |
| CN | 102039803 B | 11/2014 |

(Continued)

*Primary Examiner* — Jose A Gonzalez Quinones
(74) *Attorney, Agent, or Firm* — Maier & Maier, PLLC

(57) ABSTRACT

A motor includes a rotor, the rotor includes a rotor iron core, a first end cover, and a second end cover, and the first end cover and the second end cover are respectively connected to two ends of the rotor iron core. The first end cover is provided with a liquid inlet channel, the rotor iron core is provided with a liquid flow channel, and the first end cover or the second end cover is provided with a liquid outlet channel. The liquid inlet channel connects the liquid flow channel and space outside the rotor, the liquid outlet channel connects the liquid flow channel and the space outside the rotor, and an outlet of the liquid outlet channel faces a stator winding. Solutions of the embodiments can reduce processing costs while ensuring heat dissipation reliability of the rotor of the motor.

15 Claims, 23 Drawing Sheets

(56) References Cited

U.S. PATENT DOCUMENTS

| | | | |
|---|---|---|---|
| 2013/0119830 A1* | 5/2013 | Hautz | H02K 9/00 |
| | | | 310/60 R |
| 2015/0137632 A1 | 5/2015 | Takahashi | |
| 2016/0322874 A1 | 11/2016 | Yoshinori et al. | |

FOREIGN PATENT DOCUMENTS

| | | | | | |
|---|---|---|---|---|---|
| CN | 103532307 | B | | 5/2016 | |
| CN | 109301960 | A | | 2/2019 | |
| CN | 110071602 | A | | 7/2019 | |
| CN | 110198092 | A | | 9/2019 | |
| CN | 111756162 | A | * | 10/2020 | H02K 1/20 |
| CN | 111884428 | A | | 11/2020 | |
| DE | 102010047507 | A1 | | 6/2011 | |
| EP | 1953896 | A1 | * | 8/2008 | H02K 1/2766 |
| JP | 2008219960 | A | | 9/2008 | |
| JP | 2010239799 | A | * | 10/2010 | H02K 1/32 |
| JP | 2014183602 | A | * | 9/2014 | |
| JP | 2015231262 | A | * | 12/2015 | |
| JP | 2019030051 | A | * | 2/2019 | |
| WO | WO-2018041504 | A1 | * | 3/2018 | H02K 1/12 |

\* cited by examiner

MOTOR, MOTOR COOLING SYSTEM, AND ELECTRIC VEHICLE

CROSS-REFERENCE TO RELATED APPLICATIONS

This application is a continuation of International Application No. PCT/CN2021/085312, filed on Apr. 2, 2021, which claims priority to Chinese Patent Application No. 202010602306.X, filed on Jun. 28, 2020. The disclosures of the aforementioned applications are hereby incorporated by reference in their entireties.

TECHNICAL FIELD

The embodiments relate to the field of electric vehicle technologies, a motor, a motor cooling system, and an electric vehicle.

BACKGROUND

With development of electric vehicles, an electric vehicle assembly is developing toward a high speed and high power density, and heat consumption density of a motor becomes increasingly higher. Therefore, heat dissipation becomes an important challenge. Whether a motor can perform good heat dissipation directly affects working reliability of the motor and overall vehicle performance. A motor includes a rotor, and a heat dissipation is usually required for the rotor. However, a heat dissipation of a rotor of a conventional motor may be costly and have low reliability.

SUMMARY

The embodiments may provide a motor, a motor cooling system, and an electric vehicle, to reduce processing costs while ensuring heat dissipation reliability of a rotor of the motor.

According to a first aspect, the embodiments may provide a motor, where the motor includes a rotor, the rotor includes a rotor iron core, a first end cover, and a second end cover, and the first end cover and the second end cover are respectively connected to two ends of the rotor iron core.

The first end cover is provided with a liquid inlet channel, the rotor iron core is provided with a liquid flow channel, and the first end cover or the second end cover is provided with a liquid outlet channel. The liquid inlet channel connects the liquid flow channel and space outside the rotor, the liquid outlet channel connects the liquid flow channel and the space outside the rotor, and an outlet of the liquid outlet channel faces a stator winding.

The liquid inlet channel, the liquid flow channel, and the liquid outlet channel form a rotor channel for a coolant to flow through.

Therefore, with the liquid inlet channel disposed on the first end cover, the coolant can directly enter, through the first end cover, the liquid flow channel disposed in the rotor iron core. The coolant can approach a heat emitting point in the rotor iron core to a maximum extent, so as to ensure good heat dissipation in an area in which heat dissipation is needed in the rotor iron core. In this way, the rotor iron core can be fully cooled to ensure stable magnetism and high reliability of the rotor iron core, thereby facilitating a development trend of the motor toward a high speed. Further, compared with a conventional technique in which the coolant needs to be introduced into the rotating shaft so the coolant cools the rotor iron core through heat conduction of the rotating shaft, the embodiments may enable the coolant to directly enter the liquid flow channel of the rotor iron core through drainage implemented by using the liquid inlet channel of the first end cover. A heat transfer path of the coolant is shorter and overall processing costs and material management costs of the rotor are lower, thereby reducing processing costs while ensuring heat dissipation reliability of the rotor of the motor.

In addition, the first end cover or the second end cover is provided with the liquid outlet channel, and the outlet of the liquid outlet channel is made to face the stator winding, so that the coolant flowing into the liquid outlet channel through the liquid flow channel can be sprayed toward the stator winding after passing through the liquid outlet channel, so as to cool the stator winding. In other words, the rotor channel in this embodiment may produce of both the rotor and a stator, so that the coolant can take away heat of both the rotor and the stator. A failure caused by the rotor and the stator being in a high temperature environment for a long time is effectively avoided, and cooling performance is excellent. This helps improve working performance and prolong a service life of the motor. Further, processing costs of the motor caused by disposing a separate channel for cooling the stator can be effectively reduced, production efficiency of the motor can be improved, and an overall cooling path of the motor can be effectively simplified.

In some embodiments, the first end cover includes an end cover body and a retaining wall, the liquid inlet channel is located in the end cover body, the retaining wall is annular and protrudes from a surface that is of the end cover body and that is away from the rotor iron core and forms a liquid collection groove together with the end cover body, the liquid collection groove is connected to the liquid inlet channel, and the liquid collection groove is configured to guide the coolant to flow into the liquid inlet channel.

It can be understood that, disposing the liquid collection groove and connecting the liquid collection groove to the liquid inlet channel can provide space for accommodating the coolant. Compared with a case in which no liquid collection groove is disposed and a coolant is made to directly enter a liquid inlet channel, the embodiments may minimize a possibility of a coolant loss caused by spraying the coolant outside the rotor during high-speed rotation. In this way, the coolant can be collected in the liquid collection groove during the high-speed rotation of the rotor, and the coolant enters the liquid inlet channel through the liquid collection groove and normally cools the rotor. This helps improve working performance and prolong a service life of the motor.

In some embodiments, the rotor further includes a rotating shaft, the rotor iron core, the first end cover, and the second end cover are all sleeved around the rotating shaft, and an end that is of the retaining wall and that is away from the end cover body extends toward the rotating shaft.

It can be understood that, in a rotation process of the motor, the coolant rotates in the liquid collection groove accordingly after flowing into the liquid collection groove, and the coolant generates a centrifugal force toward the outside of the liquid collection groove under an effect of the rotation. This further results in a tendency for the coolant to be thrown out of the liquid collection groove. The end that is of the retaining wall and that is away from the end cover body is arranged to extend toward the rotating shaft, so that the end that is of the retaining wall and that is away from the end cover body presents a structure that converges toward a central axis of the end cover body. In this way, the coolant can be retained in the liquid collection groove. This prevents a coolant loss caused by failing to retain the coolant but making the coolant be sprayed out of the liquid collection groove and prevents a problem that the motor cannot work normally due to deterioration of cooling performance of the rotor.

In an embodiment, the motor further includes a stator that is sleeved around a periphery of the rotor, the stator includes a stator iron core and a stator winding wound around the stator iron core, the stator iron core is sleeved around a periphery of the rotor iron core, and two ends of the stator winding that extend out of the stator iron core are respectively a first end winding and a second end winding, where the first end winding is located on a side of the first end cover, and the second end winding is located on a side of the second end cover. In other words, an end that is of the stator winding and that is located on the side of the first end cover is the first end winding, and an end that is of the stator winding and that is located on the side of the second end cover is the second end winding.

In some embodiments, the rotor channel further includes a liquid spraying channel, where the liquid spraying channel is located on the first end cover and connects the liquid inlet channel and the space outside the rotor, and an outlet of the liquid spraying channel faces the first end winding; and the liquid outlet channel is located on the second end cover, and the outlet of the liquid outlet channel faces the second end winding.

Therefore, the rotor channel meets heat dissipation requirements of both the first end winding and the second end winding, so that the rotor channel can perform heat dissipation and cooling for both the first end winding and the second end winding. In addition, because the rotor channel can further perform heat dissipation for the rotor iron core and the heat emitting point in the rotor iron core, the rotor channel can meet heat dissipation requirements of both the rotor and the stator. This helps diversify use performance of the rotor and ensure high-speed rotation, strong practicability, and a wide application range of the motor.

In some embodiments, the rotor channel further includes a liquid spraying channel, where the liquid spraying channel is located on the first end cover, and the outlet of the liquid spraying channel faces the first end winding; and the liquid outlet channel is located on the second end cover, and the outlet of the liquid outlet channel faces the second end winding. The liquid flow channel includes a first liquid flow channel and a second liquid flow channel, where the first liquid flow channel connects the liquid inlet channel and the liquid outlet channel, and the second liquid flow channel connects the liquid outlet channel and the liquid spraying channel.

Therefore, the rotor channel meets heat dissipation requirements of both the first end winding and the second end winding, so that the rotor channel can perform heat dissipation and cooling for both the first end winding and the second end winding. In addition, because the rotor channel can further perform heat dissipation for the rotor iron core and the heat emitting point in the rotor iron core, the rotor channel can meet heat dissipation requirements of both the rotor and the stator. This helps diversify use performance of the rotor and ensure high-speed rotation, strong practicability, and a wide application range of the motor.

In some embodiments, the liquid outlet channel is located on the first end cover, and the outlet of the liquid outlet channel faces the first end winding; and the rotor channel further includes a connecting channel, where the connecting channel is disposed on the second end cover.

The liquid flow channel includes a first liquid flow channel and a second liquid flow channel, where the first liquid flow channel connects the liquid inlet channel and the connecting channel, and the second liquid flow channel connects the connecting channel and the liquid outlet channel.

Therefore, two layers of liquid flow channels may be disposed inside the rotor iron core. This helps improve cooling performance of the rotor iron core and ensure heat dissipation reliability of the rotor iron core.

In an embodiment, the rotor further includes a rotating shaft, the rotor iron core, the first end cover, and the second end cover are all sleeved around the rotating shaft, and the rotating shaft includes a first end located on the side of the first end cover and a second end located on the side of the second end cover.

In some embodiments, the first end is provided with a blind hole for the coolant to flow in and a first liquid spraying port connected to the blind hole, the first liquid spraying port is located inside the liquid collection groove, and the first liquid spraying port is configured to spray the coolant flowing into the blind hole out to the liquid collection groove.

The coolant may enter the rotating shaft from the first end of the rotating shaft, and in a rotation process of the rotor, under an effect of the centrifugal force, the coolant in the blind hole of the rotating shaft is sprayed out from the first liquid spraying port and flows into the liquid collection groove. The blind hole is disposed in the rotating shaft. In other words, the rotating shaft is disposed as a half-blocked structure. This ensures that the coolant in the blind hole can be sprayed into the liquid collection groove through the first liquid spraying port without special processing on the rotating shaft. The disposition simplifies a processing process of the rotating shaft, thereby effectively reducing processing costs of the rotating shaft and improving the production efficiency of the motor.

In some embodiments, the first end is provided with a blind hole that extends to the second end for the coolant to flow in and a first liquid spraying port connected to the blind hole, the first liquid spraying port is located inside the liquid collection groove, and the first liquid spraying port is configured to spray the coolant flowing into the blind hole out to the liquid collection groove; and the second end is provided with a second liquid spraying port connected to the blind hole, and the second liquid spraying port is configured to spray the coolant flowing into the blind hole out to the second end winding.

It can be understood that, the coolant can enter the rotating shaft from the first end of the rotating shaft, and in a rotation process of the rotor, under an effect of the centrifugal force, the coolant in the blind hole of the rotating shaft is sprayed out from the first liquid spraying port and flows into the liquid collection groove and is sprayed out from the second liquid spraying port to the second end winding. The blind hole is disposed in the rotating shaft. In other words, the rotating shaft is disposed as a half-blocked structure. This ensures that the coolant in the blind hole can be sprayed into the liquid collection groove through the first liquid spraying port without special processing on the rotating shaft. The disposition simplifies a processing process of the rotating shaft, thereby effectively reducing processing costs of the rotating shaft and improving the production efficiency of the motor.

In some embodiments, the second end is provided with a blind hole that extends to the first end for the coolant to flow in, the first end is provided with a first liquid spraying port connected to the blind hole, the first liquid spraying port is located inside the liquid collection groove, and the first liquid spraying port is configured to spray the coolant flowing into the blind hole out to the liquid collection groove.

The coolant may enter the rotating shaft from the second end of the rotating shaft, and in a rotation process of the rotor, under an effect of the centrifugal force, the coolant in the blind hole is sprayed out from the first liquid spraying port and flows into the liquid collection groove. The blind hole is disposed in the rotating shaft. In other words, the rotating shaft is disposed as a half-blocked structure. This ensures that the coolant in the blind hole can be sprayed into the liquid collection groove through the first liquid spraying port without special processing on the rotating shaft. The disposition simplifies a processing process of the rotating shaft, thereby effectively reducing processing costs of the rotating shaft and improving the production efficiency of the motor.

In some embodiments, the second end is provided with a blind hole that extends to the first end for the coolant to flow in and a first liquid spraying port connected to the blind hole; and the second end is further provided with a second liquid spraying port connected to the blind hole, and the second liquid spraying port is configured to spray the coolant flowing into the blind hole out to the second end winding.

It can be understood that, the coolant can enter the rotating shaft from the second end of the rotating shaft, and in a rotation process of the rotor, under an effect of the centrifugal force, the coolant in the blind hole is sprayed out from the first liquid spraying port and flows into the liquid collection groove and is sprayed out from the second liquid spraying port to the second end winding. The blind hole is disposed in the rotating shaft. In other words, the rotating shaft is disposed as a half-blocked structure. This ensures that the coolant in the blind hole can be sprayed into the liquid collection groove through the first liquid spraying port without special processing on the rotating shaft. The disposition simplifies a processing process of the rotating shaft, thereby effectively reducing processing costs of the rotating shaft and improving the production efficiency of the motor.

In some embodiments, the first end is provided with a blind hole for the coolant to flow in and a first liquid spraying port and a second liquid spraying port that are connected to the blind hole, the first liquid spraying port is located inside the liquid collection groove, and the first liquid spraying port is configured to spray the coolant flowing into the blind hole out to the liquid collection groove; and the second liquid spraying port is located outside the first end cover, the second liquid spraying port is configured to spray the coolant flowing into the blind hole out to the first end winding, the liquid outlet channel is located on the second end cover, and the outlet of the liquid outlet channel faces the second end winding.

The coolant may enter the rotating shaft from the first end of the rotating shaft. In a rotation process of the rotor, under an effect of the centrifugal force, one part of the coolant in the blind hole is sprayed out from the first liquid spraying port and flows into the liquid collection groove, then flows through the liquid inlet channel, the liquid flow channel, and the liquid outlet channel, and finally is sprayed out from the outlet of the liquid outlet channel to the second end winding. The other part of the coolant in the blind hole is sprayed out from the second liquid spraying port to the first end winding. Therefore, the rotor channel meets heat dissipation requirements of both the first end winding and the second end winding, so that the rotor channel can perform heat dissipation and cooling for both the first end winding and the second end winding. In addition, because the rotor channel can further perform heat dissipation for the rotor iron core and the heat emitting point in the rotor iron core, the rotor channel can meet heat dissipation requirements of both the rotor and the stator. This helps diversify use performance of the rotor and ensure high-speed rotation, strong practicability, and a wide application range of the motor. The blind hole is disposed in the rotating shaft. In other words, the rotating shaft is disposed as a half-blocked structure. This ensures that the coolant in the blind hole can be sprayed into the liquid collection groove through the first liquid spraying port without special processing on the rotating shaft. The disposition simplifies a processing process of the rotating shaft, thereby effectively reducing processing costs of the rotating shaft and improving the production efficiency of the motor.

In some embodiments, the motor further includes a liquid guide tube extending into the liquid collection groove, an end that is of the liquid guide tube and that extends into the liquid collection groove extends toward the retaining wall, and the liquid guide tube is configured to guide the coolant to flow into the liquid collection groove.

The coolant in the liquid guide tube may flow out of the liquid guide tube and may be sprayed into the liquid collection groove under effects of gravity and an initial velocity. In addition, under a rotating action of the rotor, the coolant flowing into the liquid collection groove is affected and evenly distributed in circumferential space inside the liquid collection groove. The liquid guide tube is disposed in the liquid collection groove. In other words, the rotating shaft is disposed as a fully-blocked structure. This ensures that the coolant can be sprayed into the liquid collection groove through the liquid guide tube without processing on the rotating shaft. The disposition avoids a liquid flow path through which the coolant needs to first enter the rotating shaft and then enter the liquid collection groove from the rotating shaft, so that the cooling of the rotor iron core and the heat emitting point in the rotor iron core does not need to be implemented through heat conduction of the rotating shaft. In other words, contact heat resistance of the rotating shaft and heat conduction resistance of the rotating shaft do not need to be overcome. In this way, the heat transfer path of the coolant is shortened, a large temperature difference generated by the rotor is effectively avoided, processing costs and material management costs of the rotating shaft are greatly reduced, and the production efficiency of the motor is improved.

In some embodiments, the liquid inlet channel includes a first liquid inlet channel and a second liquid inlet channel that are connected to each other, a plurality of first liquid inlet channels exist, the plurality of first liquid inlet channels are spaced along a circumferential direction of the first end cover, and the second liquid inlet channel is annular and connects the liquid flow channel and each of the first liquid inlet channels.

The plurality of first liquid inlet channels may be evenly spaced along a circumferential direction of the end cover body, so as to present a channel structure in which the plurality of first liquid inlet channels may be evenly distributed on the end cover body. The even distribution of the plurality of first liquid inlet channels can fully adapt to a scenario of high-speed rotation of the rotor and reduce imbalance caused by the rotation of the rotor. This can minimize a possibility that normal rotation of the rotor can hardly be ensured because the rotor encounters unnecessary dynamic load due to vibration of the rotor caused by the imbalance, thereby effectively ensuring dynamic balance of the rotor. The second liquid inlet channel is annular. Therefore, when the coolant flows into the second liquid inlet channel through the first liquid inlet channel, the coolant can be evenly distributed in the circumferential direction of the end cover body. In other words, the second liquid inlet channel has a flow equalization function and can evenly distribute, to the circumferential direction of the end cover body, the coolant flowing through the first liquid inlet channel. This is conducive to subsequent sufficient contact between the coolant and the rotor iron core.

In some embodiments, a plurality of liquid flow channels may exist, and the plurality of liquid flow channels may be spaced along a circumferential direction of the rotor iron core.

There may be a plurality of liquid flow channels and the plurality of liquid flow channels may be spaced along a circumferential direction of the rotating shaft. In this way, a layout is presented, in which the plurality of liquid flow channels may be spaced along the circumferential direction of the rotor iron core. Each liquid flow channel runs through the rotor iron core along an axial direction of the rotor iron core. The even distribution of the plurality of liquid flow channels can enable the rotor iron core to have a relatively uniform overall temperature. Further, the even distribution of the plurality of liquid flow channels can fully adapt to a scenario of high-speed rotation of the rotor and reduce imbalance caused by the rotation of the rotor. This can minimize a possibility that normal rotation of the rotor can hardly be ensured because the rotor encounters unnecessary dynamic load due to vibration of the rotor caused by the imbalance, thereby effectively ensuring dynamic balance of the rotor.

According to a second aspect, the embodiments may provide a motor cooling system. The motor cooling system includes a heat exchanger, a conveyor apparatus, and the motor described above. The heat exchanger is configured to receive and cool the coolant flowing out from the liquid outlet channel, and the conveyor apparatus is connected to the heat exchanger and the liquid inlet channel and is configured to convey the cooled a coolant to the liquid inlet channel and drive the coolant to flow through the rotor channel.

According to a third aspect, the embodiments may further provide an electric vehicle. The electric vehicle includes a motor controller, a speed reducer, and the motor cooling system described above. The motor controller is connected to the motor to control operation of the motor, and the speed reducer is connected to the rotating shaft of the rotor of the motor.

With the liquid inlet channel disposed on the first end cover, the coolant can directly enter, through the first end cover, the liquid flow channel disposed in the rotor iron core. The coolant can approach a heat emitting point in the rotor iron core to a maximum extent, so as to ensure good heat dissipation in an area in which heat dissipation is needed in the rotor iron core. In this way the rotor iron core can be fully cooled to ensure stable magnetism and high reliability of the rotor iron core, thereby facilitating a development trend of the motor toward a high speed. Further, compared with a conventional technique in which the coolant needs to be introduced into the rotating shaft so the coolant cools the rotor iron core through heat conduction of the rotating shaft, the embodiments may enable the coolant to directly enter the liquid flow channel of the rotor iron core through drainage implemented by using the liquid inlet channel of the first end cover. A heat transfer path of the coolant is shorter and overall processing costs and material management costs of the rotor are lower, thereby reducing processing costs while ensuring heat dissipation reliability of the rotor of the motor. In addition, the first end cover or the second end cover is provided with the liquid outlet channel, and the outlet of the liquid outlet channel is made to face the stator winding, so that the coolant flowing into the liquid outlet channel through the liquid flow channel can be sprayed toward the stator winding after passing through the liquid outlet channel, so as to cool the stator winding. In other words, the rotor channel in this embodiment may produce cooling of both the rotor and a stator, so that the coolant can take away heat of both the rotor and the stator. A failure caused by the rotor and the stator being in a high temperature environment for a long time is effectively avoided, and cooling performance is excellent. This helps improve working performance and prolong a service life of the motor. Further, processing costs of the motor caused by disposing a separate channel for cooling the stator can be effectively reduced, production efficiency of the motor can be improved, and an overall cooling path of the motor can be effectively simplified.

DETAILED DESCRIPTION OF THE EMBODIMENTS

The following clearly describes the embodiments with reference to the accompanying drawings.

Figure 1:
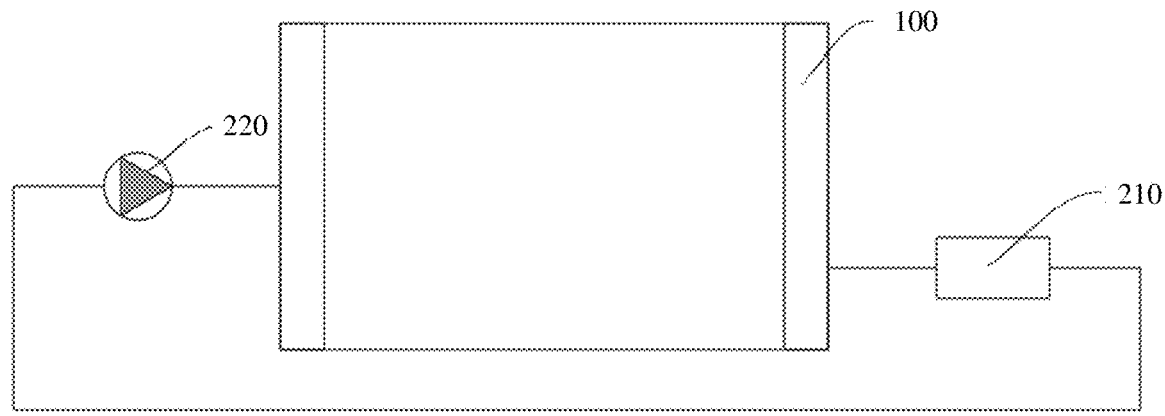
FIG. 1 is a schematic diagram of a connection relationship between a conveyor apparatus, a motor, and a heat exchanger of a motor cooling system.

Referring to FIG. 1, an embodiment may provide a motor cooling system 200 including a motor 100. The motor cooling system 200 may be applied to a mechanical device and is configured to perform heat dissipation and cooling for the motor 100. For example, the mechanical device may be any mechanical apparatus such as an electric vehicle, a processing device, or an engineering machine.

A channel may be disposed in the motor cooling system 200, and a coolant is used as a heat exchange medium, so that the coolant flows in the channel to take away heat generated by the motor 100, to implement heat dissipation and cooling of the motor 100. For example, the motor 100 may be, but is not limited to, a permanent-magnet synchronous motor, an asynchronous induction motor, or a generator. The coolant may be lubricating oil. Further, the coolant may alternatively be another cooling working substance having an insulating property. This is not limited.

Still referring to FIG. 1, in a possible implementation, the motor cooling system 200 may further include a conveyor apparatus 210 and a heat exchanger 220. The conveyor apparatus 210 may be configured to provide a driving force for the coolant, to drive the coolant to flow in the channel to take away heat from the motor 100. The heat exchanger 220 may use a cold fluid flowing in the heat exchanger 220 to absorb heat of the high-temperature coolant through heat exchange, to implement heat exchange and cooling for the coolant, and allow the coolant to be reused. In other words, the heat exchanger 220 may be configured to exchange heat with the coolant carrying the heat of the motor 100, so that the coolant is cooled, thereby allowing the coolant to be reused. For example, the conveyor apparatus 210 may be an electronic liquid pump. The heat exchanger 220 may be a liquid-water heat exchanger 220. Water may be used as the cold fluid to perform heat exchange and cooling for the coolant.

Therefore, the motor cooling system 200 according to this embodiment not only can efficiently perform heat dissipation for the motor 100, but also can implement cyclic utilization of the coolant.

It should be noted that, FIG. 1 is intended merely to provide an illustrative description on a connection relationship between the motor 100, the conveyor apparatus 210, and the heat exchanger 220, but not to limit a connection location, a structure, and a quantity of each device. However, the structure illustrated in this embodiment does not constitute a limitation on the motor cooling system 200. In some other embodiments, the motor cooling system 200 may include more or fewer components than the components shown in the figure, combine some components, split some components, or have a different component arrangement. The components shown in the figure may be implemented by using hardware, software, or a combination of software and hardware.

Figure 2:
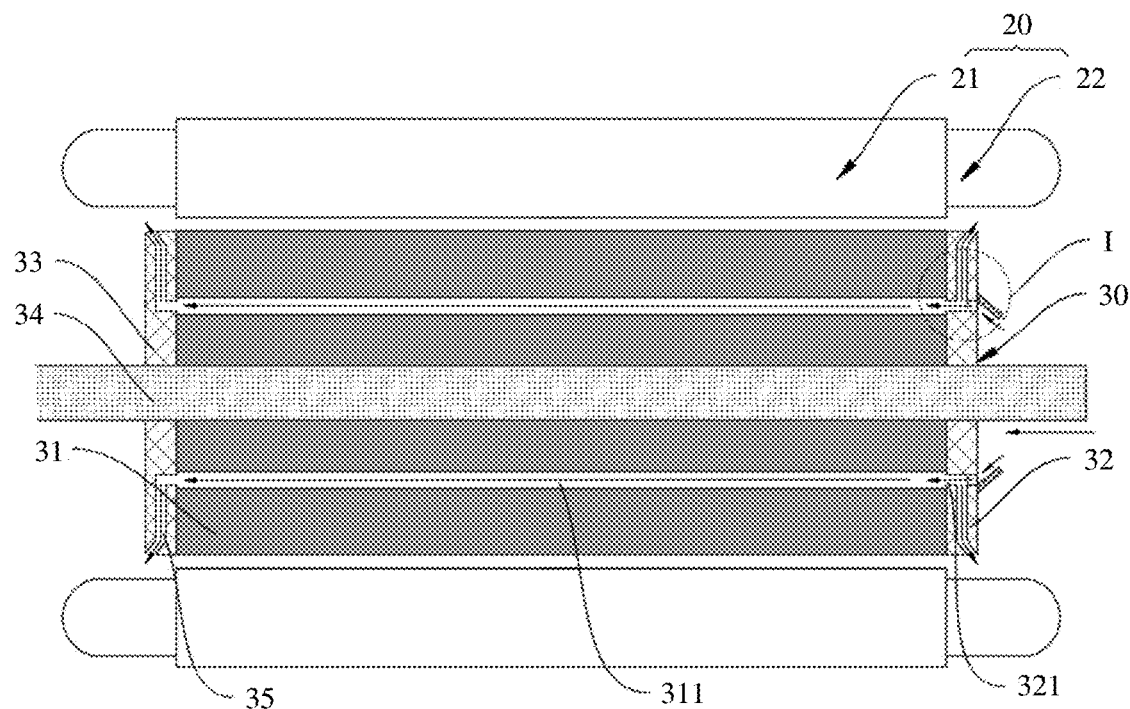
FIG. 2 is a schematic diagram of a structure of a rotor of a motor.
Figure 3:
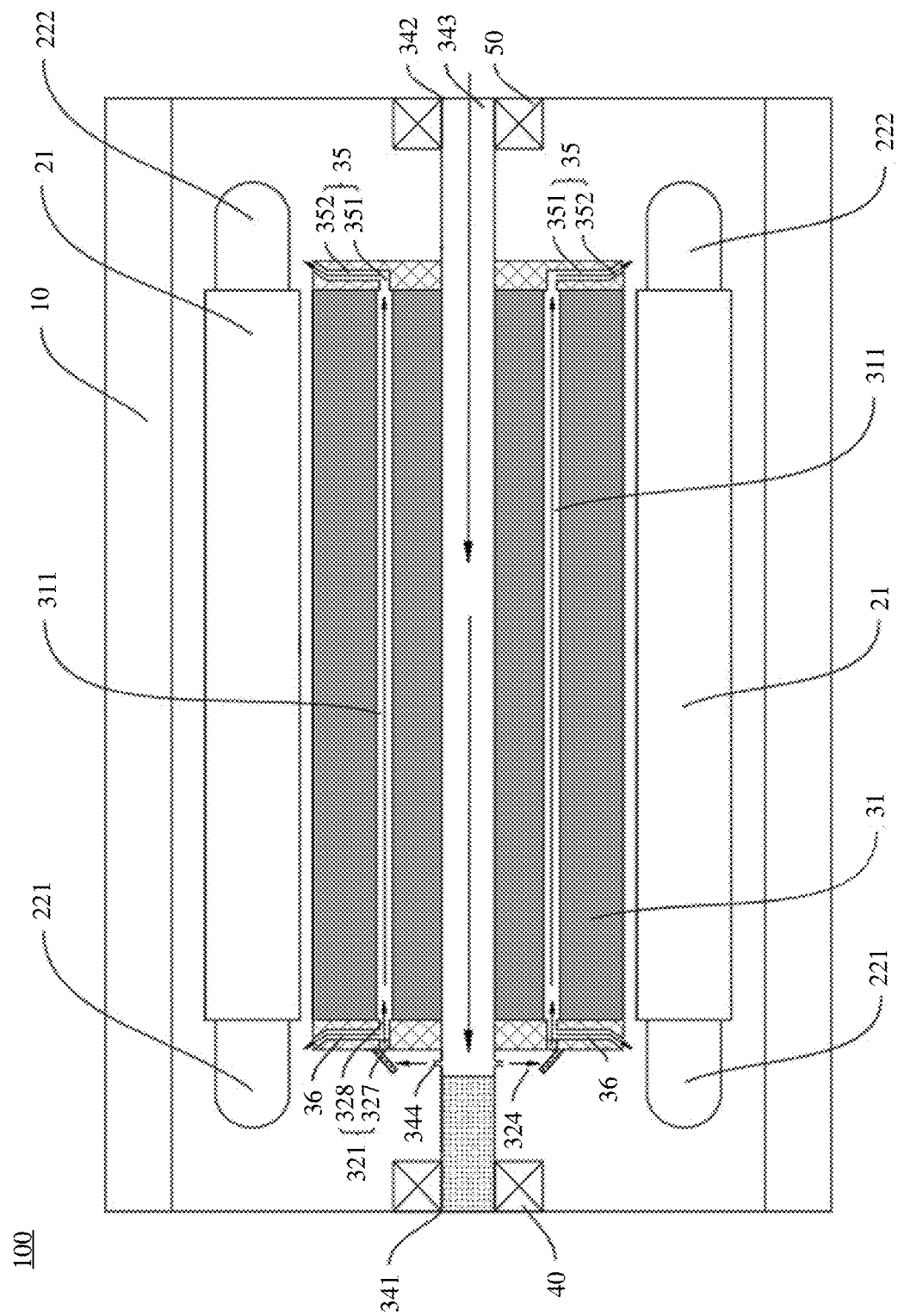
FIG. 3 is a schematic diagram of a structure of a motor according to a first embodiment.

Referring to FIG. 2 and FIG. 3, the motor 100 includes a motor housing 10, and a stator 20 and a rotor 30 disposed inside the motor housing 10. The disposition of the motor housing 10 can prevent a foreign matter from entering an interior of the motor 100 and prevent a mechanical collision from damaging an internal structure of the motor 100, thereby playing a good protection function. The stator 20 may be a stationary and fixed part of the motor 100, and can generate a rotating magnetic field after a current flows in. The rotor 30 may be a rotating part of the motor 100. For example, if the motor 100 is a permanent-magnet synchronous motor and the rotor 30 is applied to the permanent-magnet synchronous motor, the rotor 30 may generate a constant magnetic field, and may rotate, based on a principle that opposite poles are attracted to each other while same poles repel each other, under an action of the rotating magnetic field generated by the stator 20. If the motor 100 is an asynchronous induction motor and the rotor 30 is applied to the asynchronous induction motor, based on an electromagnetic induction (Electromagnetic induction) phenomenon and under an action of the rotating magnetic field generated by the stator 20, the rotor 30 may obtain an electromagnetic torque and rotate.

The stator 20 includes a stator iron core 21 and a stator winding 22. The stator iron core 21 may be cylindrical, which is a part of a magnetic path of the motor 100 and is also a mounting and fixing part of the stator winding 22. The stator winding 22 is a winding fixed on the stator iron core 21 and is a circuit part of the motor 100. The stator winding 22 can generate the rotating magnetic field after a three-phase alternating current flows in.

In this embodiment, an axial direction and a circumferential direction of the stator iron core 21 may be defined. The axial direction of the stator iron core 21 may be a direction in which a central axis of the stator iron core 21 is located, the circumferential direction of the stator iron core 21 may be a circumferential direction surrounding the central axis of the stator iron core 21, and the axial direction and the circumferential direction of the stator iron core 21 are perpendicular to each other.

The motor housing 10 may be sleeved around a periphery of the stator iron core 21 and may surround the stator iron core 21 along the circumferential direction of the stator iron core 21. In the axial direction of the stator iron core 21, a length of the motor housing 10 is greater than a length of the stator iron core 21; in other words, two ends of the stator iron core 21 are retracted inside the motor housing 10. The stator winding 22 is disposed by being wound around the stator iron core 21. In the axial direction of the stator iron core 21, two ends of the stator winding 22 respectively extend out of corresponding two ends of the stator iron core 21, but both ends of the stator winding 22 are retracted inside the motor housing 10.

Still referring to FIG. 2 and FIG. 3, the rotor 30 includes a rotating shaft 34, a rotor iron core 31, a first end cover 32, and a second end cover 33. In this embodiment, an axial direction and a circumferential direction of the rotor iron core 31 may be defined. The axial direction of the rotor iron core 31 may be a direction in which a central axis of the rotor iron core 31 is located, the circumferential direction of the rotor iron core 31 may be a circumferential direction surrounding the central axis of the rotor iron core 31, and the axial direction and the circumferential direction of the rotor iron core 31 are perpendicular to each other.

The stator iron core 21 is sleeved around a periphery of the rotor iron core 31 and surrounds the rotor iron core 31 along the circumferential direction of the rotor iron core 31. In the circumferential direction of the rotor iron core 31, there is an air gap between the rotor iron core 31 and the stator iron core 21. In addition, because the rotor iron core 31 is a part of the magnetic circuit of the motor 100, the rotor iron core 31, the stator iron core 21, and the air gap together constitute a complete magnetic circuit of the motor 100.

In this embodiment, the first end cover 32 is connected to one end of the rotor iron core 31, and the second end cover 33 is connected to the other end of the rotor iron core 31, so that the first end cover 32 and the second end cover 33 are disposed, and the first end cover 32 and the second end cover 33 are respectively connected to the two ends of the rotor iron core 31. In this way, the rotor iron core 31 can be securely fixed, and strength and stability of an overall structure of the rotor 30 can be improved.

The rotating shaft 34 is a motor shaft of the motor 100, has mechanical strength and rigidity, and is capable of conveying a torque and supporting rotation of the rotor 30. The rotor iron core 31, the first end cover 32, and the second end cover 33 are all sleeved around the rotating shaft 34, so that the rotor iron core 31, the first end cover 32, and the second end cover 33 can be driven to rotate together under a rotation action of the rotating shaft 34. The rotating shaft 34 includes a first end 341 and a second end 342 disposed oppositely. The first end 341 extends out of the first end cover 32 and is mounted to one end of the motor housing 10 through a first bearing 40, and the second end 342 extends out of the second end cover 33 and is mounted to the other end of the motor housing 10 through a second bearing 50. In other words, the first end 341 is one end that is of the rotating shaft 34 and that is located on a side of the first end cover 32, and the second end 342 is the other end that is of the rotating shaft 34 and that is located on a side of the second end cover 33.

The rotor 30 of the motor 100 may be sensitive to an operating temperature. Once the operating temperature exceeds allowed temperature specifications, the rotor 30 fails, which in turn causes the motor 100 to be scrapped. However, in a case of a high rotational speed, if the rotor 30 is not sufficiently cooled, a high speed of the motor 100 is obviously restricted. On this basis, heat dissipation is usually needed for the rotor 30, to ensure high reliability and stability of the rotor 30 in a normal working process. However, a current heat dissipation of the rotor 30 may be costly and produce low reliability.

Therefore, the structure of the rotor 30 provided in this embodiment can reduce processing costs while ensuring heat dissipation reliability of the rotor 30 of the motor 100. Details are further described below.

Referring to FIG. 2 and FIG. 3, the first end cover 32 is provided with a liquid inlet channel 321, the rotor iron core 31 is provided with a liquid flow channel 311, and the first end cover 32 or the second end cover 33 is provided with a liquid outlet channel 35. The liquid inlet channel 321 connects the liquid flow channel 311 and space outside the rotor 30, the liquid outlet channel 35 connects the liquid flow channel 311 and the space outside the rotor 30, and an outlet of the liquid outlet channel 35 faces the stator winding 22. The liquid inlet channel 321, the liquid flow channel 311, and the liquid outlet channel 35 form a rotor 30 channel for the coolant to flow through.

It can be understood that, with the liquid inlet channel 321 disposed on the first end cover 32, the coolant can directly enter, through the first end cover 32, the liquid flow channel 311 disposed in the rotor iron core 31. The coolant can approach a heat emitting point in the rotor iron core 31 to a maximum extent, so as to ensure good heat dissipation in an area in which heat dissipation is needed in the rotor iron core 31. In this way, the rotor iron core 31 can be fully cooled to ensure stable magnetism and high reliability of the rotor iron core 31, thereby facilitating a development trend of the motor 100 toward a high speed. Further, compared with a conventional technique in which the coolant needs to be introduced into the rotating shaft 34 so the coolant cools the rotor iron core 31 through heat conduction of the rotating shaft 34, the embodiments may enable the coolant to directly enter the liquid flow channel 311 of the rotor iron core 31 through drainage implemented by using the liquid inlet channel 321 of the first end cover 32. A heat transfer path of the coolant is shorter and overall processing costs and material management costs of the rotor 30 are lower, thereby reducing processing costs while ensuring heat dissipation reliability of the rotor 30 of the motor 100.

In addition, the first end cover 32 or the second end cover 33 is provided with the liquid outlet channel 35, and the outlet of the liquid outlet channel 35 is made to face the stator winding 22, so that the coolant flowing into the liquid outlet channel 35 through the liquid flow channel 311 can be sprayed toward the stator winding 22 after passing through the liquid outlet channel 35, so as to cool the stator winding 22. In other words, the rotor 30 channel in this embodiment may produce cooling of both the rotor 30 and the stator 20, so that the coolant can take away heat of both the rotor 30 and the stator 20. A failure caused by the rotor 30 and the stator 20 being in a high temperature environment for a long time is effectively avoided, and cooling performance is excellent. This helps improve working performance and prolong a service life of the motor 100. Further, processing costs of the motor 100 caused by disposing a separate channel for cooling the stator 20 can be effectively reduced, production efficiency of the motor 100 can be improved, and an overall cooling path of the motor 100 can be effectively simplified.

In a possible implementation, the motor housing 10 is provided with a housing channel (not shown in the figure), and the housing channel may provide an internal component of the motor with the coolant conveyed by another component in the motor cooling system 200. For example, the housing channel may provide the coolant to the liquid inlet channel 321, so that the coolant enters the liquid inlet channel 321 to perform heat dissipation for the rotor 30. The motor housing 10 may be provided with a channel outlet that is connected to the housing channel and that is close to one end of the stator winding 22, the channel outlet is made to face one end of the stator winding 22, and the outlet of the liquid outlet channel 35 is made to face the other end of the stator winding 22. Therefore, when the coolant flows through the housing channel, one part of the coolant can be sprayed out from the channel outlet to perform heat dissipation for one end of the stator winding 22, and the other part of the coolant can enter the liquid inlet channel 321, successively flow through the liquid flow channel 311 and the liquid outlet channel 35, and then be sprayed out from the outlet of the liquid outlet channel 35 to perform heat dissipation for the other end of the stator winding 22. Based on this, a coolant channel in the motor 100 may produce cooling of the two ends of the stator winding 22. This helps ensure heat dissipation stability and reliability of the stator winding 22.

In another possible implementation, another outlet for the coolant may be added to the rotor 30, and the outlet added for the coolant, the liquid inlet channel 321, the liquid flow channel 311, and the liquid outlet channel 35 together form the rotor 30 channel of the rotor 30, so that the rotor 30 channel may provide the cooling of the two ends of the stator winding 22. The outlet added for the coolant may be made to face one end of the stator winding 22, and the outlet of the liquid outlet channel 35 may be made to face the other end of the stator winding 22. Therefore, when the coolant flows through the rotor 30 channel, one part of the coolant can be sprayed out from the outlet added for the coolant, to perform heat dissipation for one end of the stator winding 22. The other part of the coolant can enter the liquid inlet channel 321, successively flow through the liquid flow channel 311 and the liquid outlet channel 35, and then be sprayed out from the outlet of the liquid outlet channel 35 to perform heat dissipation for the other end of the stator winding 22. Based on this, a coolant channel in the motor 100 may produce cooling of the two ends of the stator winding 22. This helps ensure heat dissipation stability and reliability of the stator winding 22. In other words, in this implementation, the rotor 30 channel may produce the cooling of the two ends of the stator winding 22.

The following description uses an example in which the rotor 30 channel may provide the cooling of the two ends of the stator winding 22. Details are further described below.

Referring to FIG. 2, FIG. 4, FIG. 5, and FIG. 6, the first end cover 32 includes an end cover body 322 and a retaining wall 323. The liquid inlet channel 321 is located in the end cover body 322, and the retaining wall 323 is annular and protrudes from a surface that is of the end cover body 322 and that is away from the rotor iron core 31 and forms a liquid collection groove 324 together with the end cover body 322. The liquid collection groove 324 is further connected to the liquid inlet channel 321, to guide the coolant to flow into the liquid inlet channel 321 for subsequent heat dissipation and cooling of the rotor 30 and the stator 20. It can be understood that, disposing the liquid collection groove 324 and connecting the liquid collection groove 324 to the liquid inlet channel 321 can provide space for accommodating the coolant. Compared with a case in which no liquid collection groove 324 is disposed and the coolant is made to directly enter the liquid inlet channel 321, the embodiments may minimize a possibility of a loss caused by spraying the coolant outside the rotor 30 during high-speed rotation of the rotor 30. In this way, the coolant can be collected in the liquid collection groove 324 during the high-speed rotation of the rotor 30, and the coolant enters the liquid inlet channel 321 through the liquid collection groove 324 and normally cools the rotor 30. This helps improve working performance and prolong a service life of the motor 100.

The end cover body 322 includes a first surface 325 and a second surface 326 disposed opposite each other. The first surface 325 is a surface that is of the end cover body 322 and that is away from the rotor iron core 31, and the second surface 326 is a surface that is of the end cover body 322 and that is in contact with the rotor iron core 31. The retaining wall 323 is annular and protrudes from the first surface 325 and extends in a direction away from the first surface 325 to form the liquid collection groove 324 together with the end cover body 322. A side wall of the liquid collection groove 324 is an inner surface of the retaining wall 323, and a bottom wall of the liquid collection groove 324 is the first surface 325 of the end cover body 322. In a possible implementation, the retaining wall 323 and the end cover body 322 are integrally formed, and the first end cover 32 integrally formed has fewer assembly operations. This helps reduce a production time and production costs.

In this embodiment, an end that is of the retaining wall 323 and that is away from the end cover body 322 extends toward the rotating shaft 34. It can be understood that, in a rotation process of the rotor 30, the coolant rotates in the liquid collection groove 324 accordingly after flowing into the liquid collection groove 324, and the coolant generates a centrifugal force toward the outside of the liquid collection groove 324 under an effect of the rotation. This further results in a tendency for the coolant to be thrown out of the liquid collection groove 324. The end that is of the retaining wall 323 and that is away from the end cover body 322 is arranged to extend toward the rotating shaft 34, so that the end that is of the retaining wall 323 and that is away from the end cover body 322 presents a structure that converges toward a central axis of the end cover body 322. In this way, the coolant can be retained in the liquid collection groove 324. This prevents a coolant loss caused by failing to retain the coolant but making the coolant be sprayed out of the liquid collection groove 324 and prevents a problem that the motor 100 cannot work normally due to deterioration of cooling performance of the rotor 30.

Figure 7:
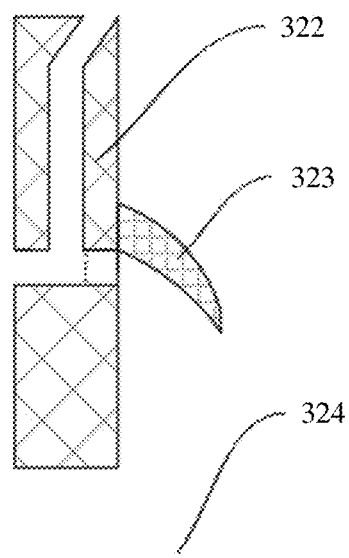
FIG. 7 is a schematic sectional view of a first end cover of the motor shown in FIG. 3.
Figure 7:
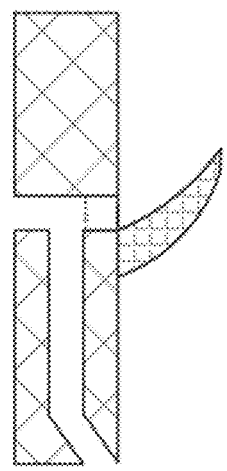

Referring to FIG. 7, in a possible implementation, a cross-sectional shape of the retaining wall 323 is approximately similar to a bowl that is placed upside down and whose bottom is removed. The cross section is a plane formed by cutting the first end cover 32 along a direction in which a central axis of the first end cover 32 is located.

Figure 8:
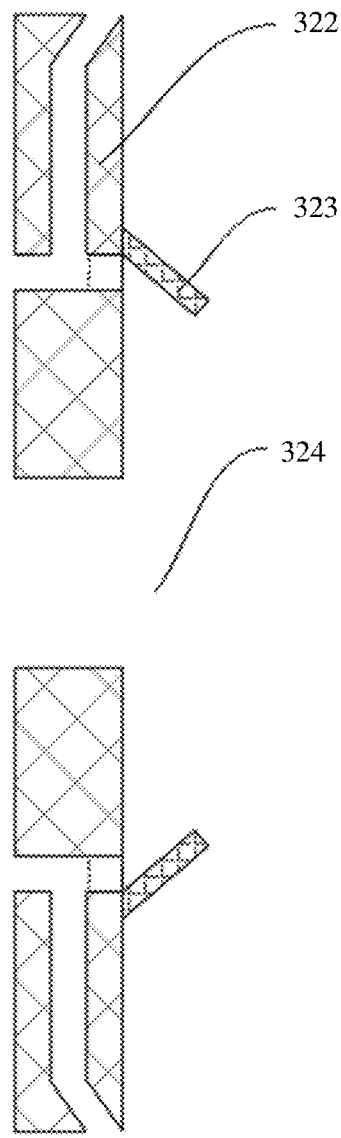
FIG. 8 is another schematic sectional view of a first end cover of the motor shown in FIG. 3.

Referring to FIG. 8, in another possible implementation, a cross-sectional shape of the retaining wall 323 is approximately similar to a triangle with a top removed. The cross section is a plane formed by cutting the first end cover 32 along a direction in which a central axis of the first end cover 32 is located.

Figure 9:
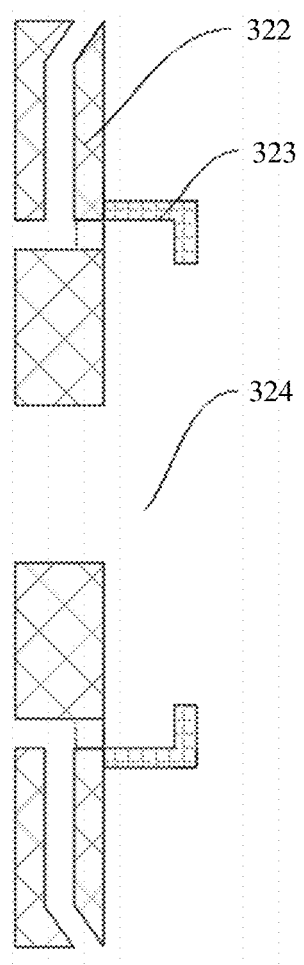
FIG. 9 is still another schematic sectional view of a first end cover of the motor shown in FIG. 3.

Referring to FIG. 9, in still another possible implementation, a cross-sectional shape of the retaining wall 323 is approximately similar to a rectangle with a part removed. The cross section is a plane formed by cutting the first end cover 32 along a direction in which a central axis of the first end cover 32 is located.

It should be noted that, the cross-sectional shape of the retaining wall 323 is not limited to the shapes described above, but may alternatively be presented as a trapezoid, a polygon, or the like with a part removed, provided that the end that is of the retaining wall 323 and that is away from the end cover body 322 extends toward the rotating shaft 34. This is not limited.

Therefore, the liquid collection groove 324 can guide a flow direction of the coolant, so that the coolant can be guided to the liquid inlet channel 321. Further, the coolant can be retained in the liquid collection groove 324, to prevent the coolant from splashing outside the liquid collection groove 324, thereby avoiding a reduction in heat dissipation efficiency. In other words, the liquid collection groove 324 has dual functions of drainage and liquid retaining and has diverse performance and strong practicability. This helps improve heat dissipation performance of the motor 100.

Figure 4:
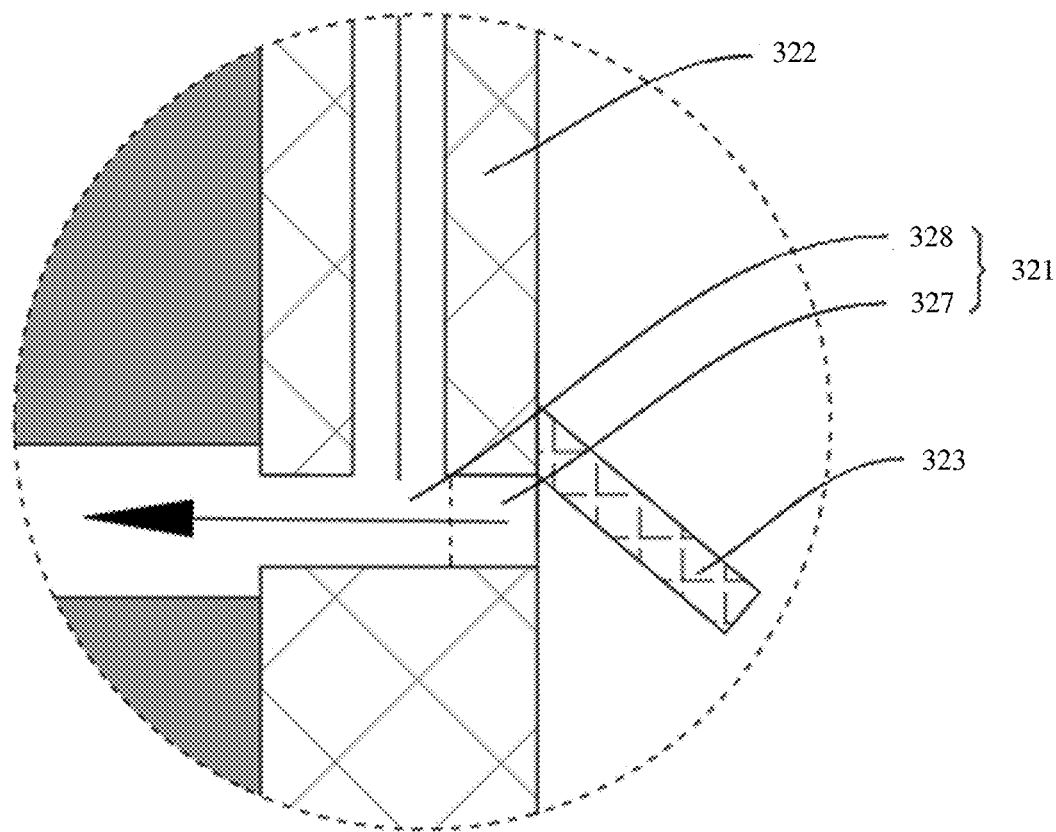
FIG. 4 is an enlarged schematic diagram of an area I shown in FIG. 2.

Still referring to FIG. 2, FIG. 4, FIG. 5, and FIG. 6, in this embodiment, the liquid inlet channel 321 includes a first liquid inlet channel 327 and a second liquid inlet channel 328 that are connected to each other (in FIG. 4, the first liquid inlet channel 327 is on a right side of a dashed line, and the second liquid inlet channel 328 is on a left side of the dashed line). There may be a plurality of first liquid inlet channels 327, and the plurality of first liquid inlet channels 327 are spaced along a circumferential direction of the first end cover 32. The second liquid inlet channel 328 is annular and connects the first liquid inlet channel 327 and the liquid flow channel 311.

Figure 5:
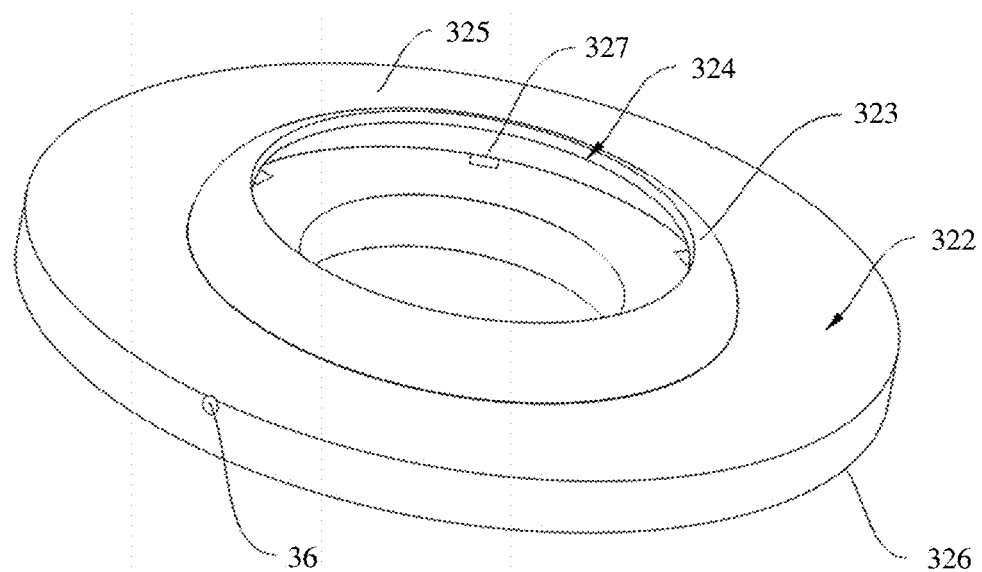
FIG. 5 is a schematic diagram of a structure of a first end cover of the motor shown in FIG. 3 from one perspective.
Figure 6:
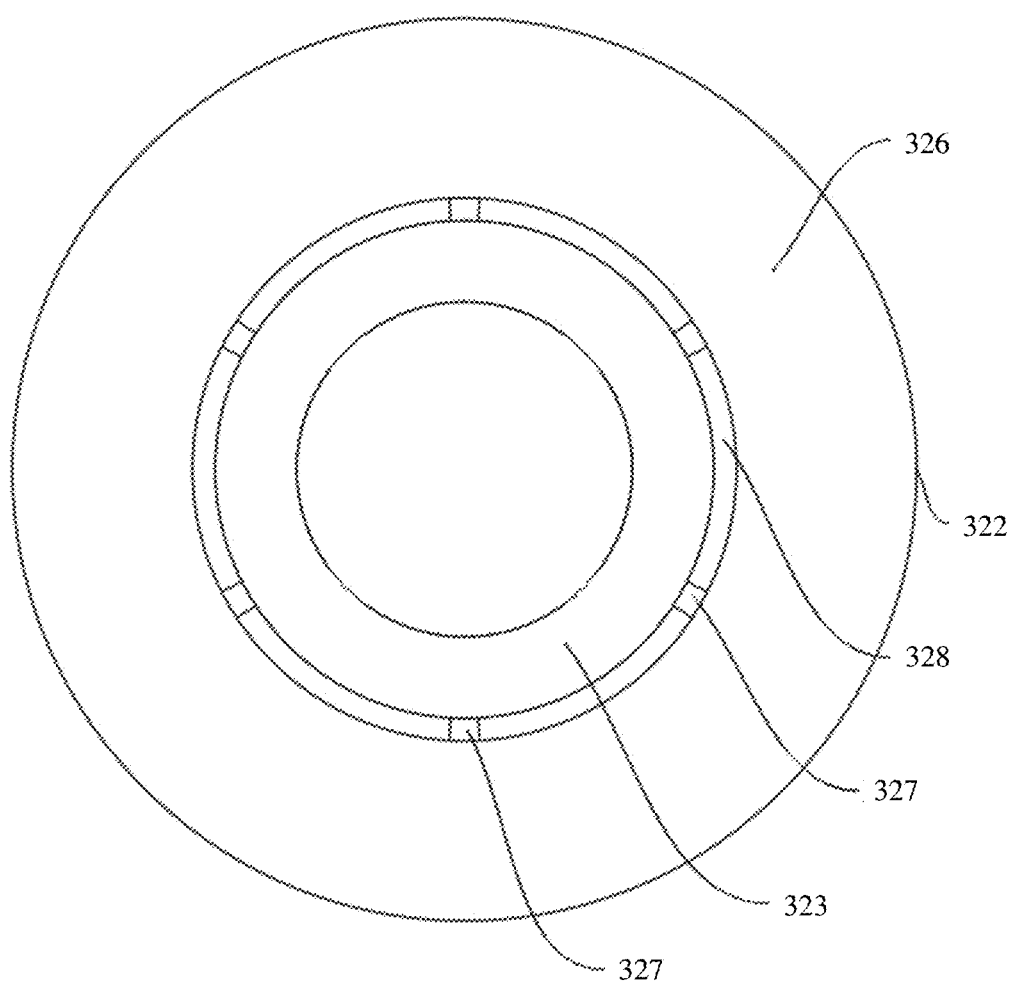
FIG. 6 is a schematic diagram of a structure of a first end cover of the motor shown in FIG. 3 from another perspective.

As shown in FIG. 5, each first liquid inlet channel 327 may be formed by a depression from the first surface 325 of the end cover body 322 into the end cover body 322, and an inlet of the first liquid inlet channel 327 is located at the bottom wall of the liquid collection groove 324 to connect to the liquid collection groove 324, so that the coolant entering the liquid collection groove 324 can smoothly enter the first liquid inlet channel 327 to perform heat dissipation for the rotor 30. As shown in FIG. 6, the plurality of first liquid inlet channels 327 are evenly spaced along the circumferential direction of the end cover body 322, so as to present a channel structure in which the plurality of first liquid inlet channels 327 are evenly distributed on the end cover body 322. The even distribution of the plurality of first liquid inlet channels 327 can fully adapt to a scenario of high-speed rotation of the rotor 30 and reduce imbalance caused by the rotation of the rotor 30. This can minimize a possibility that normal rotation of the rotor 30 can hardly be ensured because the rotor 30 encounters unnecessary dynamic load due to vibration of the rotor 30 caused by the imbalance, thereby effectively ensuring dynamic balance of the rotor 30.

In this embodiment, an example in which there are six first liquid inlet channels 327 is used for description, and the six first liquid inlet channels 327 are evenly distributed in the circumferential direction of the end cover body 322. However, in other embodiments, a quantity of first liquid inlet channels 327 may be two, four, eight, or the like, which is not limited. On the basis of ensuring structural rigidity of the first end cover 32 and fully considering processing costs of the first end cover 32, a higher quantity of first liquid inlet channels 327 indicates a more uniform coolant after the coolant enters the liquid inlet channel 321 through the liquid collection groove 324 and then subsequently flows into the liquid flow channel 311, thereby facilitating high-speed rotation of the motor 100.

Still referring to FIG. 5, in a possible implementation, the inlet of each first liquid inlet channel 327 extends from an intersecting line of the side wall of the liquid collection groove 324 and the bottom wall of the liquid collection groove 324 toward the central axis of the first end cover 32, so that the inlet of the first liquid inlet channel 327 presents a layout in which the inlet of the first liquid inlet channel 327 is attached to the side wall of the liquid collection groove 324. It can be understood that, after the coolant flows into the liquid collection groove 324, the coolant is attached to the side wall of the liquid collection groove 324 under an effect of rotation. Therefore, by attaching the inlet of the first liquid inlet channel 327 to the side wall of the liquid collection groove 324, the coolant can naturally flow from the side wall of the liquid collection groove 324 into the inlet of the first liquid inlet channel 327 during the rotation. This shortens a flow path of the coolant, so that the coolant can fully and evenly flow into the inlets of the first liquid inlet channels 327.

In another possible implementation, there is a spacing between the inlet of each first liquid inlet channel 327 and an intersecting line of the side wall of the liquid collection groove 324 and the bottom wall of the liquid collection groove 324, so that the inlet of the first liquid inlet channel 327 presents a layout in which the inlet of the first liquid inlet channel 327 is close to the side wall of the liquid collection groove 324. It can be understood that, after the coolant flows into the liquid collection groove 324, the coolant moves in a direction toward the side wall of the liquid collection groove 324 under an effect of the rotation. Therefore, by arranging the inlet of the first liquid inlet channel 327 to be close to the side wall of the liquid collection groove 324, the coolant can flow into the first liquid inlet channel 327 during the rotation. In this way, on the basis of the high-speed rotation of the motor 100, it is ensured that the coolant can smoothly flow into the rotor 30 to perform heat dissipation for the rotor 30, thereby improving effective utilization of the coolant.

Still referring to FIG. 6, the second liquid inlet channel 328 may be formed by a depression from the second surface 326 of the end cover body 322 into the end cover body 322, and the second liquid inlet channel 328 is connected to each first liquid inlet channel 327. The second liquid inlet channel 328 may be annular, so that when the coolant flows into the second liquid inlet channel 328 through the first liquid inlet channel 327, the coolant can be evenly distributed in the circumferential direction of the end cover body 322. In other words, the second liquid inlet channel 328 has a flow equalization function and can evenly distribute, to the circumferential direction of the end cover body 322, the coolant flowing through the first liquid inlet channel 327. This is conducive to subsequent sufficient contact between the coolant and the rotor iron core 31.

Figure 10:
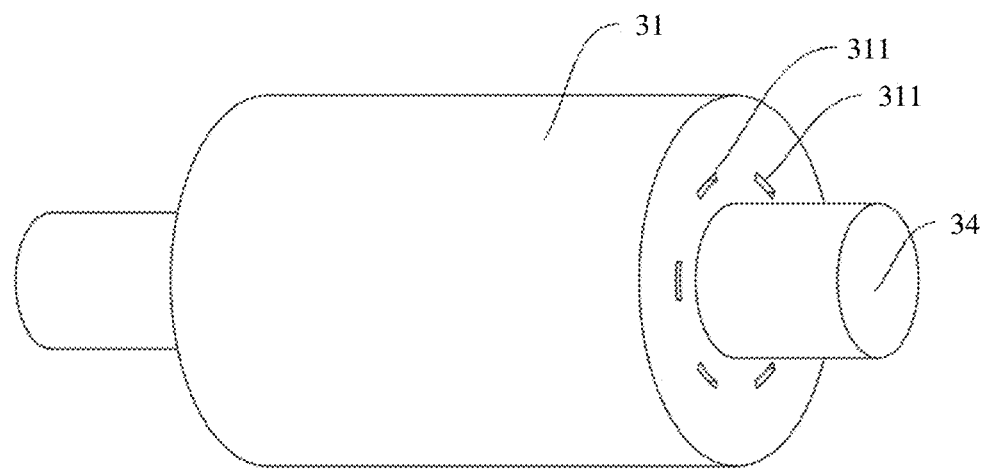
FIG. 10 is a schematic diagram of a partial structure of the motor shown in FIG. 3.
Figure 11:
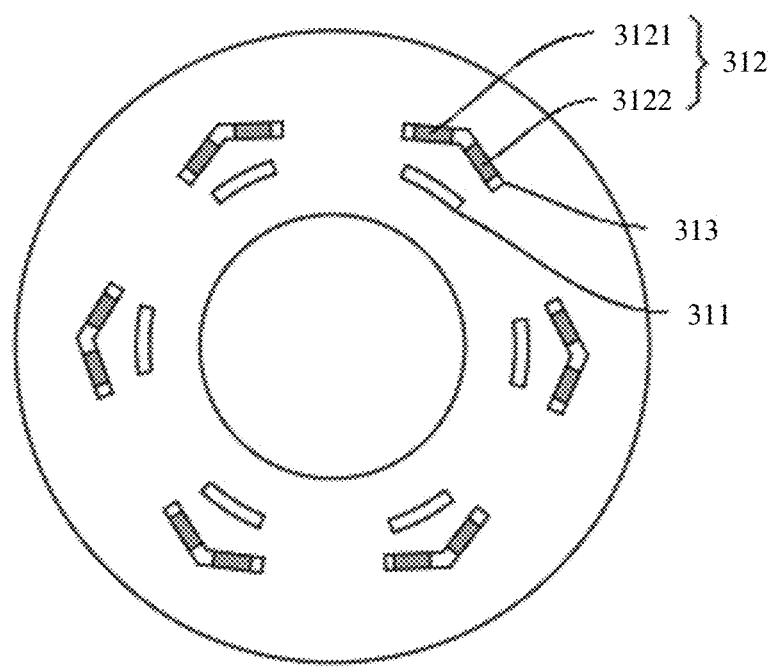
FIG. 11 is a schematic diagram of another partial structure of the motor shown in FIG. 3.

Referring to FIG. 10 and FIG. 11, in a possible implementation, the motor 100 is a permanent-magnet synchronous motor, the rotor 30 further includes a plurality of permanent magnets 312, the plurality of permanent magnets 312 are spaced on the rotor iron core 31 along a circumferential direction of the rotating shaft 34, and the plurality of permanent magnets 312 may provide a constant magnetic field to the rotor 30. For example, the permanent magnet 312 may be magnetic steel.

The rotor iron core 31 is provided with a plurality of slots 313 at equal intervals along the circumferential direction of the rotating shaft 34, thereby presenting a structure in which the plurality of slots 313 are evenly distributed on the rotor iron core 31. Each slot 313 runs through the rotor iron core 31 along the axial direction of the rotor iron core 31 for inserting one permanent magnet 312. The even distribution of the plurality of slots 313 can fully adapt to a scenario of high-speed rotation of the rotor 30 and reduce imbalance caused by the rotation of the rotor 30. This can minimize a possibility that normal rotation of the rotor 30 can hardly be ensured because the rotor 30 encounters unnecessary dynamic load due to vibration of the rotor 30 caused by the imbalance, thereby effectively ensuring dynamic balance of the rotor 30.

For example, as shown in FIG. 11, a cross-sectional shape of each slot 313 along the circumferential direction of the rotor iron core 31 may be similar to a V-shaped boomerang, and each permanent magnet 312 includes a first permanent magnet 3121 and a second permanent magnet 3122. Both the first permanent magnet 3121 and the second permanent magnet 3122 are disposed in the slot 313; in other words, each slot 313 may be configured to insert one first permanent magnet 3121 and one second permanent magnet 3122.

The permanent magnet 312 inside the rotor iron core 31 may be sensitive to an operating temperature. Once the operating temperature of the rotor 30 rises excessively and exceeds allowed temperature specifications of the permanent magnet 312, irreversible demagnetization is caused to the permanent magnet 312, and the motor 100 fails. A high temperature may come from eddy heating of the rotor iron core 31 and the permanent magnet 312 themselves. Therefore, when a structure of the permanent-magnet synchronous motor is considered, a cooling channel may be disposed inside the rotor iron core 31, so that the permanent magnet 312 and the rotor iron core 31 may be directly cooled, to reduce temperatures of the permanent magnet 312 and the rotor iron core 31, and improve working efficiency of the motor 100.

In other words, in the permanent-magnet synchronous motor, the permanent magnet 312 may be a heat emitting point of the rotor 30. The cooling channel disposed inside the rotor iron core 31 needs to meet dual performance of cooling the heat emitting point and cooling the rotor iron core 31.

In another possible implementation, the motor 100 is a squirrel-cage asynchronous induction motor, and the rotor 30 further includes a plurality of guide bars (not shown in the figure). The plurality of guide bars may be spaced in the rotor iron core 31 along the circumferential direction of the rotating shaft 34. For example, the guide bars may be copper bars.

The rotor iron core 31 is provided with a plurality of guide slots (not shown in the figure) at equal intervals along the circumferential direction of the rotating shaft 34, thereby presenting a structure in which the plurality of guide slots may be evenly distributed on the rotor iron core 31. Each guide slot runs through the rotor iron core 31 along the axial direction of the rotor iron core 31 for inserting one guide bar, and one end ring (not shown in the figure) is separately disposed at both ends of the rotor iron core 31 for connecting parts that are of all the guide bars and that extend from the corresponding guide slots. The even distribution of the plurality of guide slots can fully adapt to a scenario of high-speed rotation of the rotor 30 and reduce imbalance caused by the rotation of the rotor 30. This can minimize a possibility that normal rotation of the rotor 30 can hardly be ensured because the rotor 30 encounters unnecessary dynamic load due to vibration of the rotor 30 caused by the imbalance, thereby effectively ensuring dynamic balance of the rotor 30.

It can be understood that, when the asynchronous induction motor starts, the guide bar is easily affected by a start current and generates an electric heating loss, and the guide bar emits heat. The heat emission easily causes unbalanced temperatures at both ends of the guide bar. Consequently, the guide bar is bent and deformed and even fractured, causing a failure of the motor 100. Therefore, when a structure of the asynchronous induction motor is considered, a cooling channel may be disposed inside the rotor iron core 31 so that the guide bar and the rotor iron core 31 can be directly cooled, to reduce temperatures of the guide bar and the rotor iron core 31, and improve working efficiency of the motor 100.

In other words, in the asynchronous induction motor, the guide bar may be a heat emitting point of the rotor 30. The cooling channel disposed inside the rotor iron core 31 needs to meet dual performance of cooling the heat emitting point and cooling the rotor iron core 31.

Therefore, as shown in FIG. 10 and FIG. 11, in this embodiment, the liquid flow channel 311 is disposed inside the rotor iron core 31, and the liquid flow channel 311 is the foregoing cooling channel disposed inside the rotor iron core 31 and can adapt to and meet heat dissipation requirements of a plurality of types of motors 100. In this way, after flowing into the liquid flow channel 311, the coolant not only can perform heat dissipation for the rotor iron core 31, but also can get closer to the heat emitting point of the rotor 30 and perform heat dissipation for the heat emitting point, thereby reducing heat dissipation resistance and improving a cooling effect.

There may be a plurality of liquid flow channels 311, and the plurality of liquid flow channels 311 may be spaced along the circumferential direction of the rotating shaft 34. In this way, a layout is presented, in which the plurality of liquid flow channels 311 are spaced along the circumferential direction of the rotor iron core 31. Each liquid flow channel 311 runs through the rotor iron core 31 along the axial direction of the rotor iron core 31. The even distribution of the plurality of liquid flow channels 311 may enable the rotor iron core 31 to have a relatively uniform overall temperature. Further, the even distribution of the plurality of liquid flow channels 311 can fully adapt to a scenario of high-speed rotation of the rotor 30 and reduce imbalance caused by the rotation of the rotor 30. This can minimize a possibility that normal rotation of the rotor 30 can hardly be ensured because the rotor 30 encounters unnecessary dynamic load due to vibration of the rotor 30 caused by the imbalance, thereby effectively ensuring dynamic balance of the rotor 30.

In a possible implementation, a quantity of liquid flow channels 311 is in a one-to-one correspondence with a quantity of heat emitting points of the rotor 30. For example, in the permanent-magnet synchronous motor, each permanent magnet 312 is one heat emitting point of the rotor 30, and each heat emitting point corresponds to one liquid flow channel 311. In other words, as shown in FIG. 11, each permanent magnet 312 matches one liquid flow channel 311, so that the liquid flow channel 311 implements dual functions of performing heat dissipation for the rotor iron core 31 and performing heat dissipation for the rotor 30, thereby facilitating high-speed rotation of the motor 100.

Referring to FIG. 3 and FIG. 10, because the second liquid inlet channel 328 is further connected to the liquid flow channel 311 in the rotor iron core 31, when the coolant enters the plurality of liquid flow channels 311 through the second liquid inlet channel 328, the coolant flows into each of the liquid flow channels 311 evenly, so that the rotor iron core 31 has a uniform temperature distribution and good temperature uniformity. In a possible embodiment, as shown in FIG. 3, a size of the second liquid inlet channel 328 in a direction perpendicular to the central axis of the rotor 30 is smaller than a size of the liquid flow channel 311 in the direction perpendicular to the central axis of the rotor 30, so that the coolant can smoothly enter the liquid flow channel 311 and it is ensured that the coolant exists in the liquid flow channel 311.

It can be understood that, after flowing out of the liquid flow channel 311, the coolant flows into the liquid outlet channel 35 and flows out of the rotor 30 through the outlet of the liquid outlet channel 35 disposed in the first end cover 32 or the second end cover 33. In addition, the outlet of the liquid outlet channel 35 faces the stator winding 22, and two ends of the stator winding 22 that protrude from the stator iron core 21 are a first end winding 221 and a second end winding 222 respectively. The first end winding 221 is located at a same side of the first end cover 32, and the second end winding 222 is located at a same side of the second end cover 33. In other words, an end that is of the stator winding 22 and that is located on the side of the first end cover 32 is the first end winding 221, and an end that is of the stator winding 22 and that is located on the side of the second end cover is the second end winding.

Therefore, when the liquid outlet channel 35 is disposed on the first end cover 32, heat dissipation and cooling can be performed for the first end winding 221; and when the liquid outlet channel 35 is disposed on the second end cover 33, heat dissipation and cooling can be performed for the second end winding 222. To avoid a problem that the motor 100 fails because a local temperature of the stator winding 22 is excessively high due to non-uniform heat dissipation at both ends of the stator winding 22, another outlet for the coolant may be added to the rotor 30, and the outlet added for the coolant, the liquid inlet channel 321, the liquid flow channel 311, and the liquid outlet channel 35 together form the rotor 30 channel of the rotor 30. In this way, the rotor 30 channel in this embodiment may meet heat dissipation requirements of both the first end winding 221 and the second end winding 222, and the rotor 30 channel can perform heat dissipation and cooling for both the first end winding 221 and the second end winding 222.

The following fully describes in detail the embodiments.

Referring to FIG. 3 and FIG. 6, in a first embodiment, the motor housing 10 is provided with a housing channel (not shown in the figure), and the housing channel may provide an internal component of the motor with the coolant conveyed by another component of the motor cooling system 200. For example, the housing channel may provide the coolant to the liquid inlet channel 321, so that the coolant enters the liquid inlet channel 321 to perform heat dissipation for the rotor 30.

The second end 342 of the rotating shaft 34 is provided with a blind hole 343 extending to the first end 341 for the coolant to flow in. The blind hole 343 may be connected to the housing channel through a flow guide tube (not shown in the figure). In this way, the coolant entering the motor 100 through the housing channel can flow into the blind hole 343 at the second end 342 under a guiding action of the flow guide tube, thereby implementing inner-shaft flowing of the rotating shaft 34. In other words, in this embodiment, the coolant can flow in from the second end 342 of the rotating shaft 34. The first end 341 of the rotating shaft 34 is provided with a first liquid spraying port 344 connected to the blind hole 343. The first liquid spraying port 344 is located inside the liquid collection groove 324, and the first liquid spraying port 344 is configured to spray the coolant flowing into the blind hole 343 out to the liquid collection groove 324.

It can be understood that, in a rotation process of the rotor 30, under an effect of the centrifugal force, the coolant in the blind hole 343 is sprayed out from the first liquid spraying port 344 and flows into the liquid collection groove 324. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving production efficiency of the motor 100.

It should be noted that, a structure of the first liquid spraying port 344 in FIG. 3 is merely for an illustrative purpose and does not represent an actual structural form thereof. The structure may be a hole-like structure that runs through a shaft wall of the rotating shaft 34 and is connected to the blind hole 343. A diameter of the first liquid spraying port 344 may be set according to an actual requirement, provided that the coolant sprayed from the first liquid spraying port 344 can be sprayed into the liquid collection groove 324 without splashing outside the liquid collection groove 324. This is not limited. A quantity of first liquid spraying ports 344 may also be set according to an actual requirement, provided that better dynamic balance of the rotor 30 can be achieved as far as possible while it is ensured that the coolant is sprayed into the liquid collection groove 324. For example, there may be two first liquid spraying ports 344, and the two first liquid spraying ports 344 are symmetrically disposed at the first end 341 of the rotating shaft 34.

In this embodiment, after entering the liquid collection groove 324, the coolant, under an effect of the centrifugal force, enters the liquid inlet channel 321 connected to the liquid collection groove 324.

Still referring to FIG. 3 and FIG. 5, the rotor 30 channel further includes a liquid spraying channel 36. The liquid spraying channel 36 is located on the first end cover 32 and connects the liquid inlet channel 321 and the space outside the rotor 30, an inlet of the liquid spraying channel 36 is located in the liquid inlet channel 321, and an outlet of the liquid spraying channel 36 faces the first end winding 221. The liquid outlet channel 35 is located on the second end cover 33, and the outlet of the liquid outlet channel 35 faces the second end winding 222. Therefore, one part of the coolant can flow into the liquid spraying channel 36 through the liquid inlet channel 321 and be sprayed out from the outlet of the liquid spraying channel 36 to perform heat dissipation for the first end winding 221. The other part of the coolant can enter the liquid inlet channel 321, successively flow into the liquid flow channel 311 and the liquid outlet channel 35, and then be sprayed out from the outlet of the liquid outlet channel 35 to perform heat dissipation for the second end winding 222. In this way, the coolant can perform heat dissipation and cooling for both the first end winding 221 and the second end winding 222, thereby facilitating high-speed rotation of the motor 100. It can be understood that, in this embodiment, the outlet of the liquid spraying channel 36 is the foregoing outlet added for the coolant.

After entering the liquid collection groove 324, the coolant enters the first liquid inlet channel 327 directly connected to the liquid collection groove 324 and flows into the second liquid inlet channel 328 through the first liquid inlet channel 327. The second liquid inlet channel 328 is connected to the liquid spraying channel 36, so that after the coolant enters the second liquid inlet channel 328, one part of the coolant enters the liquid spraying channel 36.

In this embodiment, an example in which there are two liquid spraying channels 36 is used for description, and the two liquid spraying channels 36 are symmetrically disposed in the end cover body 322. The symmetrical disposition helps ensure dynamic balance of the rotor 30. In other embodiments, a quantity of liquid spraying channels 36 may be four, six, or the like, which is not limited.

In a possible implementation, the liquid spraying channel 36 has a unified aperture, and a size of the overall aperture of the liquid spraying channel 36 may be controlled to adjust a traffic size of the coolant entering the liquid spraying channel 36. A larger aperture of the liquid spraying channel 36 indicates more liquid traffic of the coolant entering the liquid spraying channel 36, and a smaller aperture of the liquid spraying channel 36 indicates less liquid traffic of the coolant entering the liquid spraying channel 36. The aperture size of the liquid spraying channel 36 may be adjusted according to an actual requirement and is not limited.

In this embodiment, an extension direction of each liquid spraying channel 36 intersects an extension direction of the first end winding 221, so that an included angle is present between the extension direction of the liquid spraying channel 36 and the extension direction of the first end winding 221. For example, the included angle may be 40°, 45°, or 50°, which is not limited. The disposition enables as much of the coolant as possible to be sprayed to the first end winding 221 while staying away from the stator iron core 21 when the coolant is sprayed out from the outlet of the liquid spraying channel 36 under a rotational action of the rotor 30, thereby preventing the coolant from being sprayed to the stator iron core 21 and adversely affecting the stator 20. In a possible implementation, a cross-sectional shape of each liquid spraying channel 36 may be presented as a bent-line shape shown in FIG. 3, or the cross-sectional shape of each liquid spraying channel 36 may be presented as an arc shape. The cross section is a plane formed by cutting the first end cover 32 along a direction in which the central axis of the first end cover 32 is located.

The second liquid inlet channel 328 is further connected to the liquid flow channel 311, so that after the coolant enters the second liquid inlet channel 328, the other part of the coolant enters the liquid outlet channel 35 through the liquid flow channel 311.

Figure 12:
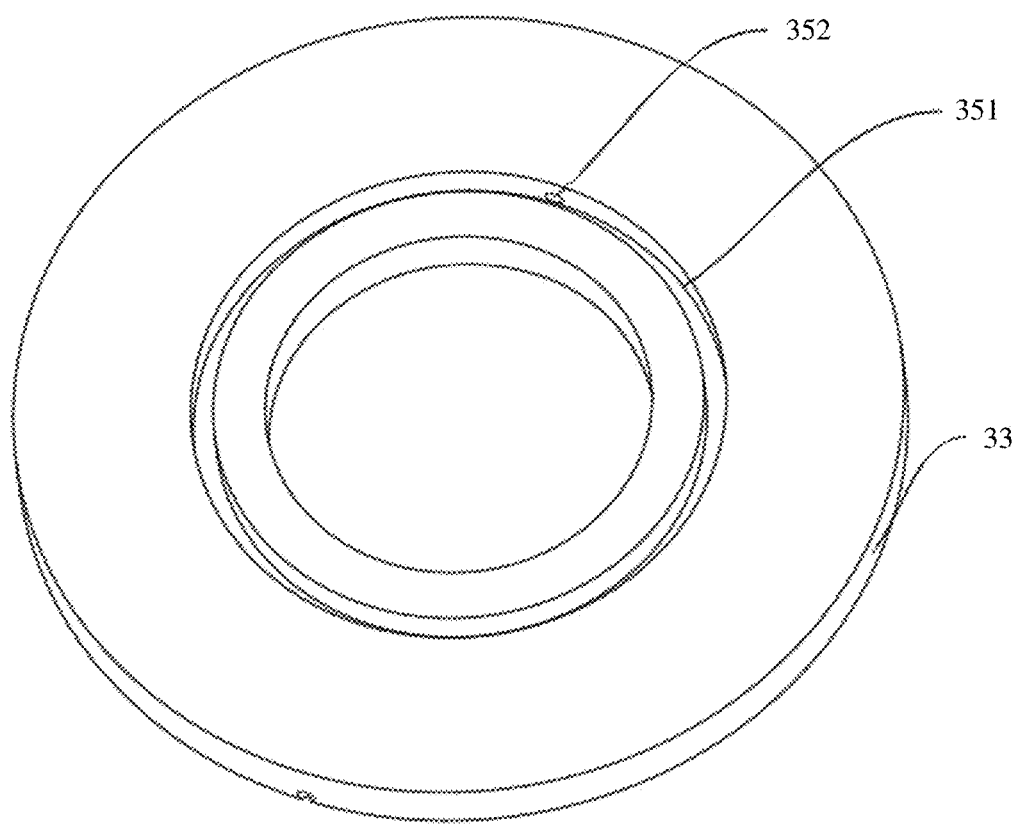
FIG. 12 is a schematic diagram of a structure of a second end cover of the motor shown in FIG. 3.

Referring to FIG. 3 and FIG. 12, the liquid outlet channel 35 includes a first liquid outlet channel 351 and a second liquid outlet channel 352 that are connected to each other. The first liquid outlet channel 351 is annular and is connected to the liquid flow channel 311, the second liquid outlet channel 352 connects the first liquid outlet channel 351 and the space outside the rotor 30, and an outlet of the second liquid outlet channel 352 faces the second end winding 222. The outlet of the second liquid outlet channel 352 may be the outlet of the liquid outlet channel 35 described above.

The first liquid outlet channel 351 may be formed by a depression on a surface that is of the second end cover 33 and that is close to the rotor iron core 31, and the first liquid outlet channel 351 is annular, so that when the coolant flows into the first liquid outlet channel 351 through the plurality of liquid flow channels 311, the coolant can be evenly distributed in a circumferential direction of the second end cover 33. In other words, the first liquid outlet channel 351 has a flow equalization function and can evenly distribute, to the circumferential direction of the second end cover 33, the coolant flowing through the plurality of liquid flow channels 311. This is conducive to subsequent spraying of the coolant out from the second end cover 33.

In this embodiment, an example in which there are two second liquid outlet channels 352 is used for description, and the two second liquid outlet channels 352 are symmetrically disposed on the second end cover 33. The symmetrical disposition helps ensure dynamic balance of the rotor 30. Additionally, in other embodiments, a quantity of second liquid outlet channels 352 may be four, six, or the like, which is not limited.

An extension direction of each second liquid outlet channel 352 intersects an extension direction of the second end winding 222, so that an included angle is present between the extension direction of each second liquid outlet channel 352 and the extension direction of the second end winding 222. For example, the included angle may be 40°, 45°, or 50°, which is not limited. The disposition enables as much of the coolant as possible to be sprayed to the second end winding 222 while staying away from the stator iron core 21 when the coolant is sprayed out from the second liquid outlet channel 352 under a rotational action of the rotor 30, thereby preventing the coolant from being sprayed to the stator iron core 21 and adversely affecting the stator 20. In a possible implementation, a cross-sectional shape of each second liquid outlet channel 352 may be presented as a bent-line shape shown in FIG. 3, or the cross-sectional shape of each second liquid outlet channel 352 may be presented as an arc shape. The cross section is a plane formed by cutting the second end cover 33 along a direction in which a central axis of the second end cover 33 is located.

As shown in FIG. 3, in this embodiment, the blind hole 343, the first liquid spraying port 344, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 3 is a flow direction of the coolant.

The rotor 30 channel in this embodiment may enable the coolant to flow into the rotating shaft 34 through the blind hole 343 disposed at the second end 342 of the rotating shaft 34, be sprayed into the liquid collection groove 324 from the first liquid spraying port 344 disposed at the first end 341 of the rotating shaft 34, and flow into the second liquid inlet channel 328 through the first liquid inlet channel 327 after entering the liquid collection groove 324. For the coolant entering the second liquid inlet channel 328, one part of the coolant enters the liquid spraying channel 36 and is sprayed to the first end winding 221 from the outlet of the liquid spraying channel 36. The other part of the coolant sequentially enters the liquid flow channel 311 and the first liquid outlet channel 351, then enters the second liquid outlet channel 352, and is sprayed to the second end winding 222 from the outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 13:
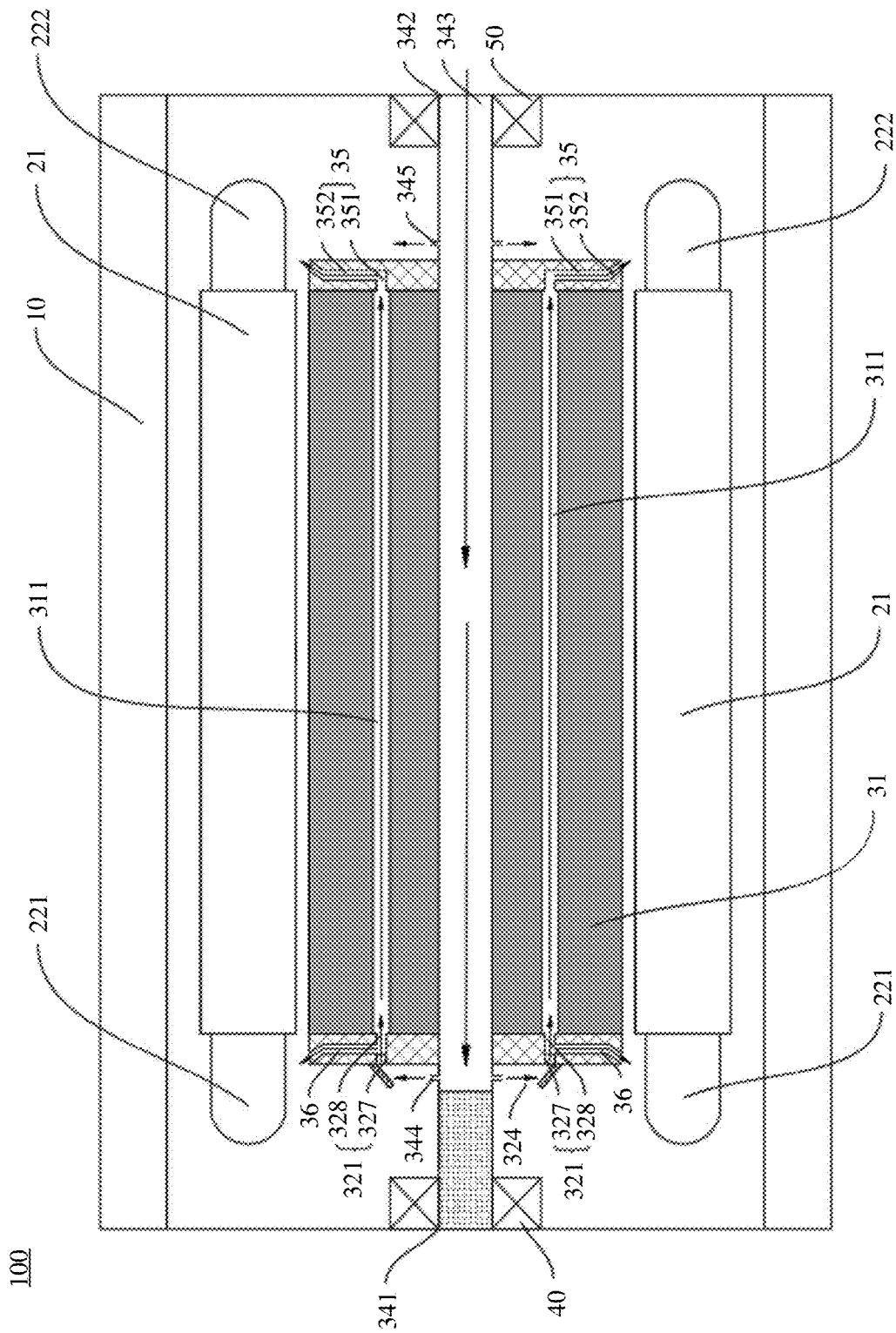
FIG. 13 is a schematic diagram of a structure of a motor according to a second embodiment.

Referring to FIG. 13, a second embodiment is different from the foregoing first embodiment in that the second end 342 of the rotating shaft 34 is further provided with a second liquid spraying port 345 connected to a blind hole 343. The second liquid spraying port 345 is located outside the second end cover 33, and the second liquid spraying port 345 is configured to spray the coolant flowing into the blind hole 343 out to the second end winding 222. In a rotation process of the rotor 30, under an effect of the centrifugal force, the coolant in the blind hole 343 is sprayed out from the second liquid spraying port 345 to the second end winding 222, to perform heat dissipation and cooling for the second end winding 222.

It should be noted that, a structure of the second liquid spraying port 345 in FIG. 13 is merely for an illustrative purpose and does not represent an actual structural form thereof. The structure may be a hole-like structure that runs through a shaft wall of the rotating shaft 34 and is connected to the blind hole 343. A diameter of the second liquid spraying port 345 may be set according to an actual requirement, provided that the coolant sprayed from the second liquid spraying port 345 can be sprayed to the second end winding 222. This is not limited. In addition, a quantity of second liquid spraying ports 345 may also be set according to an actual requirement, provided that better dynamic balance of the rotor 30 can be achieved as far as possible while it is ensured that the coolant is sprayed to the second end winding 222. For example, there may be two second liquid spraying ports 345, and the two second liquid spraying ports 345 are symmetrically disposed at the second end 342 of the rotating shaft 34.

As shown in FIG. 13, in this embodiment, the blind hole 343, the second liquid spraying port 345, the first liquid spraying port 344, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 13 is a flow direction of the coolant.

The rotor 30 channel in this embodiment may enable the coolant to flow into the rotating shaft 34 through the blind hole 343 disposed at the second end 342 of the rotating shaft 34. For the coolant flowing into the rotating shaft 34, one part of the coolant is sprayed to the second end winding 222 from the second liquid spraying port 345 disposed at the second end 342. The other part of the coolant is sprayed into the liquid collection groove 324 from the first liquid spraying port 344 disposed at the first end 341 of the rotating shaft 34, and then flows into the second liquid inlet channel 328 through the first liquid inlet channel 327 after entering the liquid collection groove 324. For the coolant entering the second liquid inlet channel 328, one part of the coolant enters the liquid spraying channel 36 and is sprayed to the first end winding 221 from the outlet of the liquid spraying channel 36. The other part of the coolant sequentially enters the liquid flow channel 311 and the first liquid outlet channel 351, then enters the second liquid outlet channel 352, and is sprayed to the second end winding 222 from an outlet of the second liquid outlet channel 352.

Therefore, the disposition of the second liquid spraying port 345 can further coordinate with the second liquid outlet channel 352 to perform cooling and heat dissipation for the second end winding 222, thereby further improving a heat dissipation effect of the second end winding 222. The rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 14:
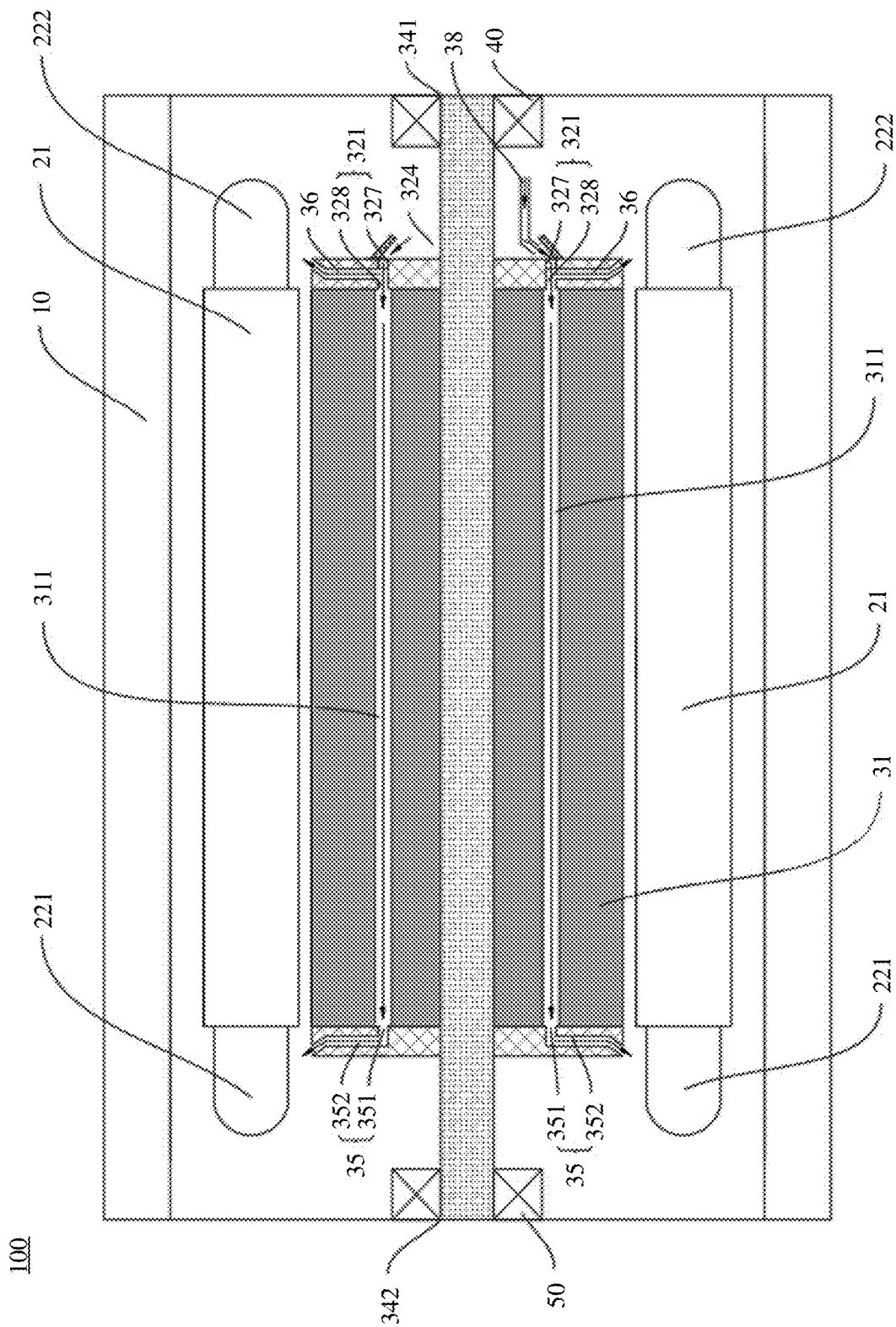
FIG. 14 is a schematic diagram of a structure of a motor according to a third embodiment.
Figure 15:
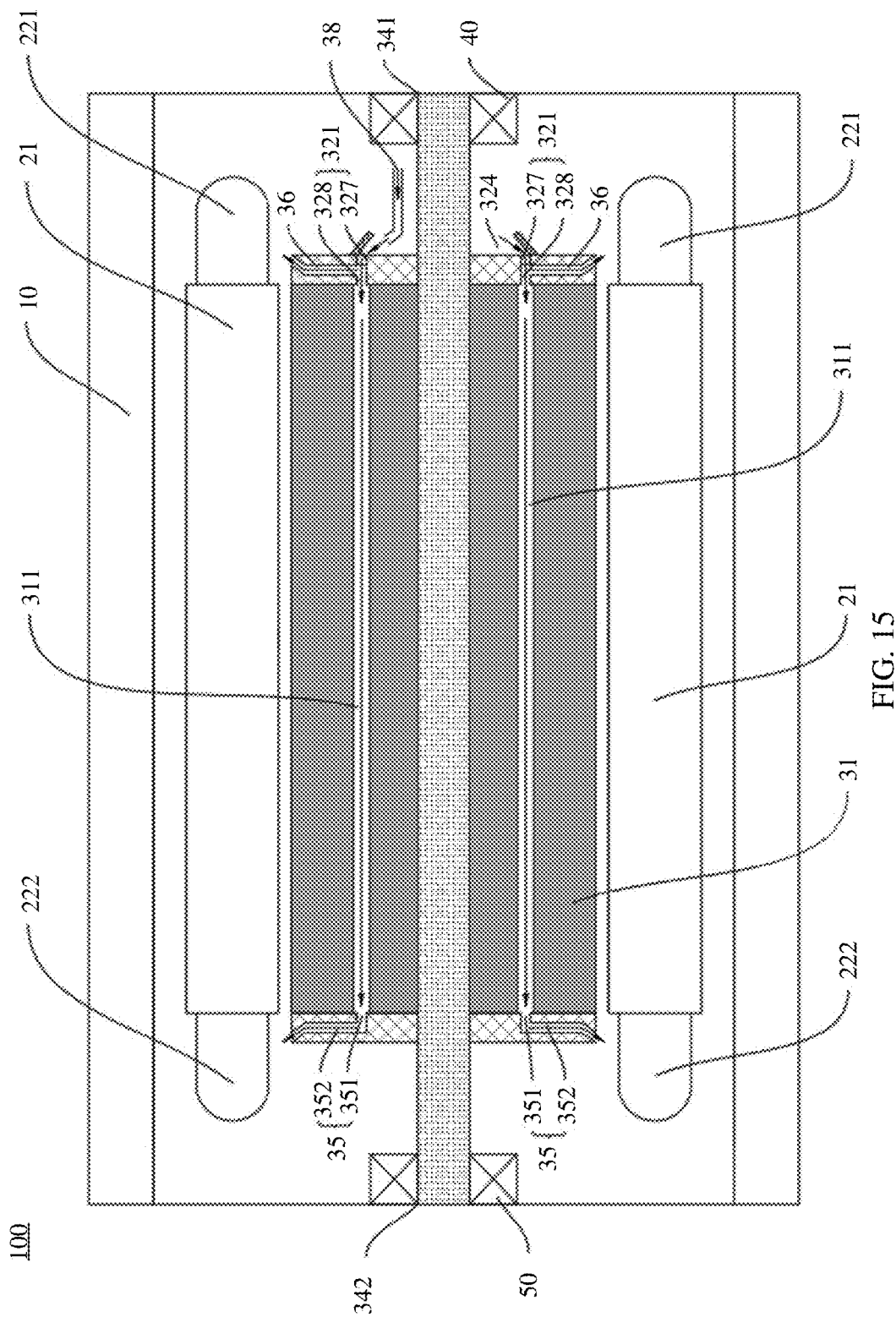
FIG. 15 is a schematic diagram of another structure of the motor according to the third embodiment.

Referring to FIG. 14 and FIG. 15, a third embodiment is different from the foregoing first embodiment in that the coolant does not enter the liquid collection groove 324 from the rotating shaft 34. In other words, no special structural processing needs to be performed on the rotating shaft 34 for flowing of the coolant. Instead, the rotating shaft 34 may be disposed as a fully-blocked structure to increase strength of the rotating shaft 34 and greatly reduce processing costs required for processing the rotating shaft 34.

The motor housing 10 is provided with a housing channel (not shown in the figure), and the housing channel may provide an internal component of the motor with the coolant conveyed by another component of the motor cooling system 200. For example, the housing channel may provide the coolant to the liquid inlet channel 321, so that the coolant enters the liquid inlet channel 321 to perform heat dissipation for the rotor 30.

The motor 100 further includes a liquid guide tube 38 extending into the liquid collection groove 324. The liquid guide tube 38 may be connected to the housing channel through a flow guide tube (not shown in the figure). In this way, the coolant entering the motor 100 through the housing channel can flow into the liquid guide tube 38 under a guiding action of the flow guide tube to provide the liquid to the liquid collection groove 324.

The coolant in the liquid guide tube 38 may flow out of the liquid guide tube 38 and may be sprayed into the liquid collection groove 324 under effects of gravity and an initial velocity. In addition, under a rotating action of the rotor 30, the coolant flowing into the liquid collection groove 324 is affected and evenly distributed in circumferential space inside the liquid collection groove 324. The liquid guide tube 38 is disposed in the liquid collection groove 324. In other words, the rotating shaft 34 is disposed as a fully-blocked structure. This ensures that the coolant can be sprayed into the liquid collection groove 324 through the liquid guide tube 38 without processing on the rotating shaft 34. The disposition avoids a liquid flow path through which the coolant needs to first enter the rotating shaft 34 and then enter the liquid collection groove 324 from the rotating shaft 34, so that the cooling of the rotor iron core 31 and the heat emitting point in the rotor iron core 31 does not need to be implemented through heat conduction of the rotating shaft 34. In other words, contact heat resistance of the rotating shaft 34 and heat conduction resistance of the rotating shaft 34 do not need to be overcome. In this way, the heat transfer path of the coolant is shortened, a large temperature difference generated by the rotor 30 is effectively avoided, processing costs and material management costs of the rotating shaft 34 are greatly reduced, and the production efficiency of the motor 100 is improved.

Still referring to FIG. 14 and FIG. 15, an end that is of the liquid guide tube 38 and that extends into the liquid collection groove 324 extends toward the retaining wall 323, and the liquid guide tube 38 is configured to guide the coolant into the liquid collection groove 324. For example, a cross-sectional shape of the end that is of the liquid guide tube 38 and that extends into the liquid collection groove 324 may be presented as a -bent-line shape shown in FIG. 14 and FIG. 15. The cross section is a plane formed by cutting the first end cover 32 along a direction in which the central axis of the first end cover 32 is located. The disposition enables the coolant to flow along the side wall of the liquid collection groove 324 under effects of gravity and rotation after flowing out of the liquid guide tube 38. This can reduce a possibility that the coolant is thrown out of the liquid collection groove 324, and also minimize a possibility of splashing on the rotating shaft 34 when liquid traffic of the coolant is large, thereby avoiding adverse impact on the rotating shaft 34. Also, in other embodiments, an extension direction of the end that is of the liquid guide tube 38 and that extends into the liquid collection groove 324 may be parallel to the central axis of the first end cover 32.

In this embodiment, an example in which there is one liquid guide tube 38 is used for description. The liquid guide tube 38 may be located below the rotating shaft 34 shown in FIG. 14 or may be located above the rotating shaft 34 shown in FIG. 15. A location of the liquid guide tube 38 may be selected according to an actual requirement. This is not limited.

Therefore, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 14 and FIG. 15 is a flow direction of the coolant.

The rotor 30 channel in this embodiment may enable the coolant to flow into the liquid collection groove 324 through the liquid guide tube 38 disposed in the liquid collection groove 324, and then flow into the second liquid inlet channel 328 through the first liquid inlet channel 327 after entering the liquid collection groove 324. For the coolant entering the second liquid inlet channel 328, one part of the coolant enters the liquid spraying channel 36 and is sprayed to the first end winding 221 from the outlet of the liquid spraying channel 36. The other part of the coolant sequentially enters the liquid flow channel 311 and the first liquid outlet channel 351, then enters the second liquid outlet channel 352, and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 16:
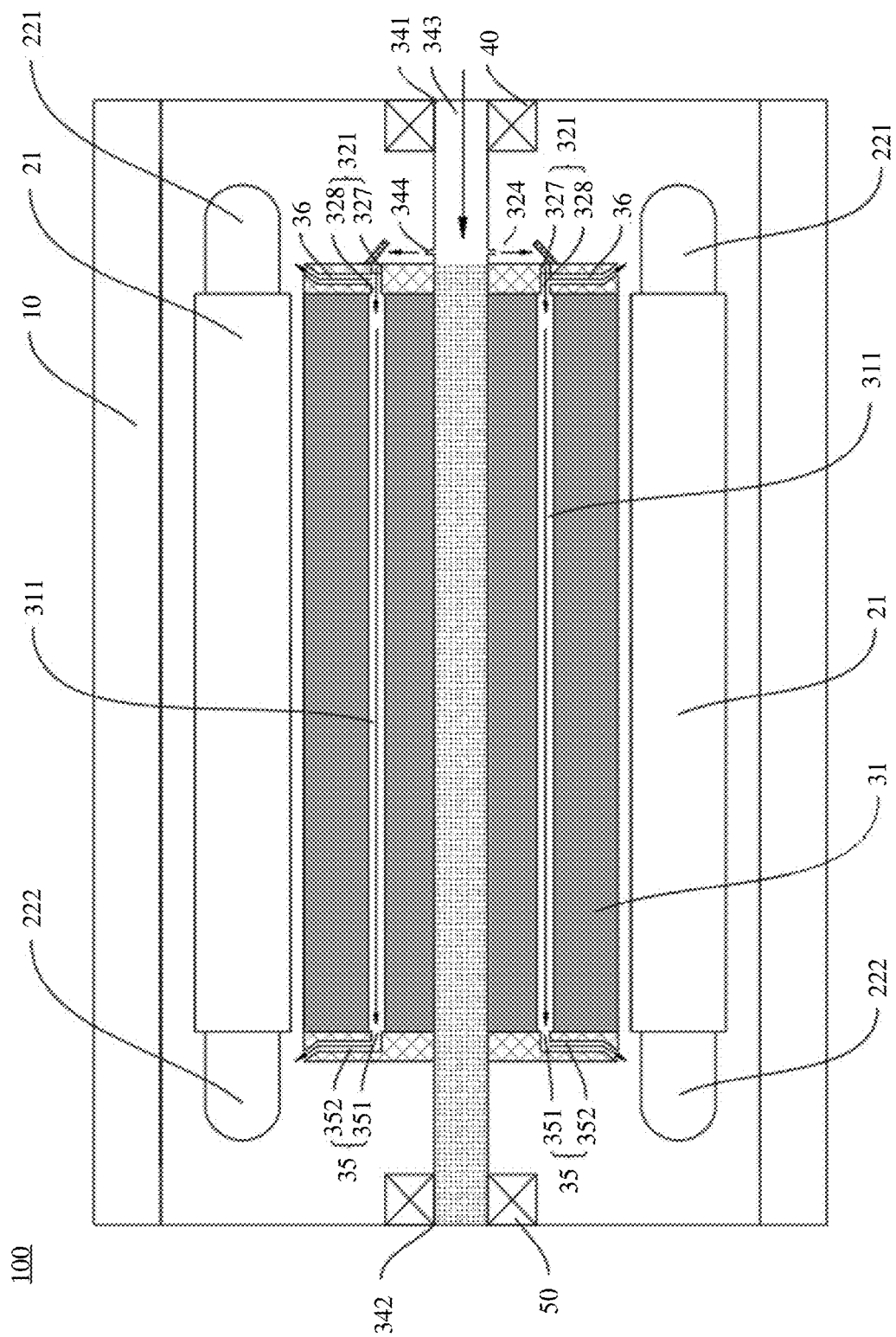
FIG. 16 is a schematic diagram of a structure of a motor according to a fourth embodiment.

Referring to FIG. 16, a fourth embodiment is different from the foregoing first embodiment in that the first end 341 of the rotating shaft 34 is provided with a blind hole 343 for the coolant to flow in and a first liquid spraying port 344 connected to the blind hole 343. The blind hole 343 may be connected to a housing channel (not shown in the figure) of the motor housing 10 through a flow guide tube (not shown in the figure). In this way, the coolant entering the motor 100 through the housing channel can flow into the blind hole 343 under a guiding action of the flow guide tube, thereby implementing inner-shaft flowing of the rotating shaft 34. In other words, the coolant can flow in from the first end 341 of the rotating shaft 34. The first liquid spraying port 344 is located inside the liquid collection groove 324, and the first liquid spraying port 344 is configured to spray the coolant flowing into the blind hole 343 out to the liquid collection groove 324.

It can be understood that, in a rotation process of the rotor 30, under an effect of the centrifugal force, the coolant in the blind hole 343 is sprayed out from the first liquid spraying port 344 and flows into the liquid collection groove 324. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving the production efficiency of the motor 100.

In this embodiment, the blind hole 343, the first liquid spraying port 344, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 16 is a flow direction of the coolant.

The rotor 30 channel in this embodiment may enable the coolant to flow into the rotating shaft 34 through the blind hole 343 disposed at the first end 341 of the rotating shaft 34, be sprayed into the liquid collection groove 324 from the first liquid spraying port 344 disposed at the first end 341 of the rotating shaft 34, and flow into the second liquid inlet channel 328 through the first liquid inlet channel 327 after entering the liquid collection groove 324. For the coolant entering the second liquid inlet channel 328, one part of the coolant enters the liquid spraying channel 36 and is sprayed to the first end winding 221 from the outlet of the liquid spraying channel 36. The other part of the coolant sequentially enters the liquid flow channel 311 and the first liquid outlet channel 351, then enters the second liquid outlet channel 352, and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 17:
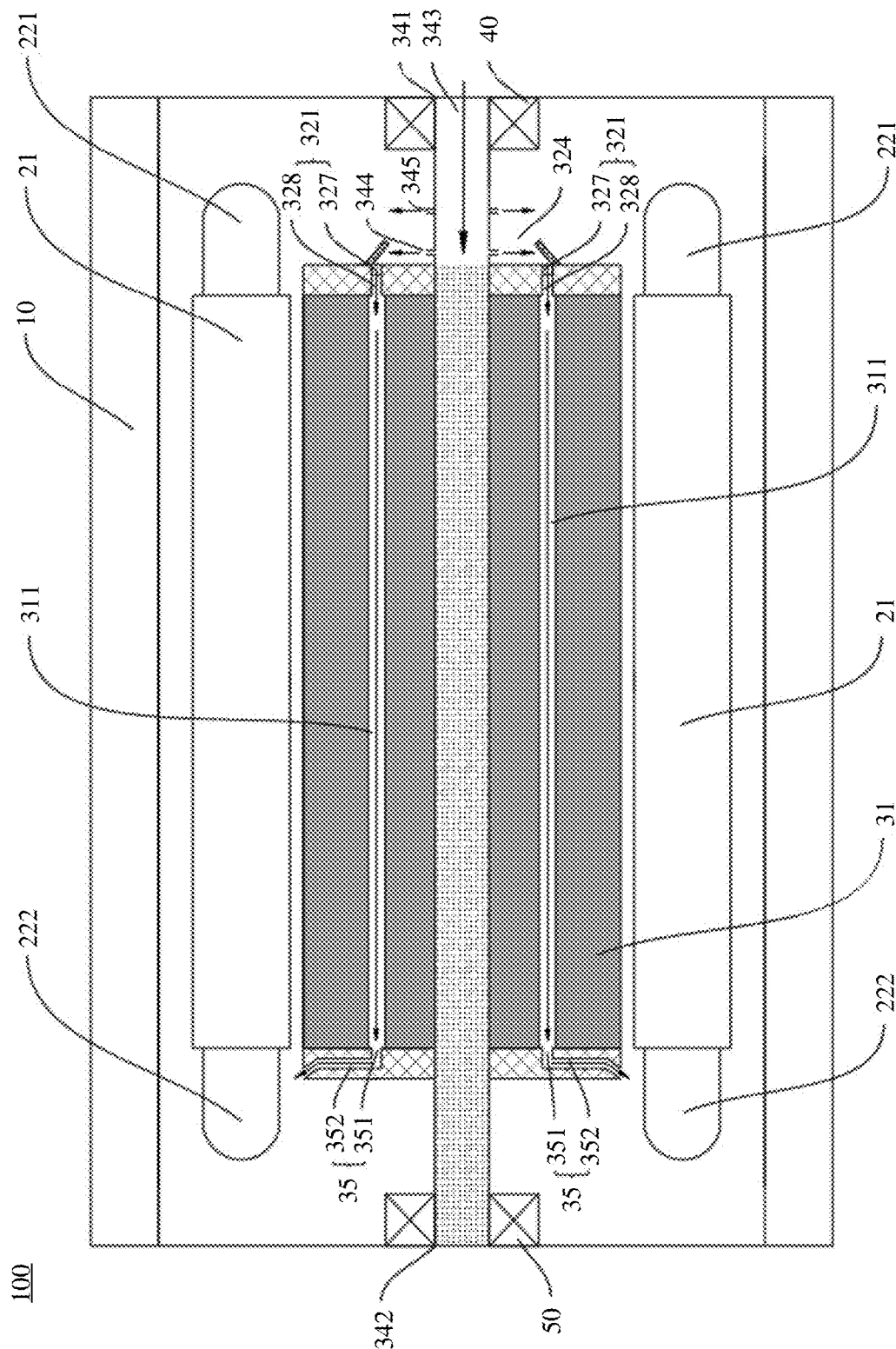
FIG. 17 is a schematic diagram of a structure of a motor according to a fifth embodiment.

Referring to FIG. 17, a fifth embodiment is different from the foregoing fourth embodiment in that the rotor 30 channel does not include a liquid spraying channel, and the first end 341 of the rotating shaft 34 is provided with not only a first liquid spraying port 344 connected to a blind hole 343 but also a second liquid spraying port 345 connected to the blind hole 343. The second liquid spraying port 345 is located outside the first end cover 32, and the second liquid spraying port 345 is configured to spray the coolant flowing into the blind hole 343 out to the first end winding 221. It can be understood that, in this embodiment, the second liquid spraying port 345 is the foregoing outlet added for the coolant.

In a rotation process of the rotor 30, under an effect of the centrifugal force, the coolant in the blind hole 343 is sprayed out from the second liquid spraying port 345 to the first end winding 221, to perform heat dissipation and cooling for the first end winding 221.

It should be noted that, a structure of the second liquid spraying port 345 in FIG. 17 is merely for an illustrative purpose and does not represent an actual structural form thereof. The structure may be a hole-like structure that runs through the shaft wall of the rotating shaft 34 and is connected to the blind hole 343. A diameter of the second liquid spraying port 345 may be set according to an actual requirement, provided that the coolant sprayed from the second liquid spraying port 345 can be sprayed to the first end winding 221. This is not limited. In addition, a quantity of second liquid spraying ports 345 may also be set according to an actual requirement, provided that better dynamic balance of the rotor 30 can be achieved as far as possible while it is ensured that the coolant is sprayed to the first end winding 221. For example, there may be two second liquid spraying ports 345, and the two second liquid spraying ports 345 are symmetrically disposed at the first end 341 of the rotating shaft 34.

In this embodiment, the blind hole 343, the second liquid spraying port 345, the first liquid spraying port 344, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 17 is a flow direction of the coolant.

The rotor 30 channel in this embodiment may enable the coolant to flow into the rotating shaft 34 through the blind hole 343 disposed at the first end 341 of the rotating shaft 34. For the coolant flowing into the rotating shaft 34, one part of the coolant is sprayed to the second end winding 222 from the second liquid spraying port 345 disposed at the first end 341 of the rotating shaft 34. The other part of the coolant is sprayed into the liquid collection groove 324 from the first liquid spraying port 344 disposed at the first end 341 of the rotating shaft 34. After entering the liquid collection groove 324, the coolant sequentially flows through the first liquid inlet channel 327, the second liquid inlet channel 328, the liquid flow channel 311, the first liquid outlet channel 351, and the second liquid outlet channel 352, and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 18:
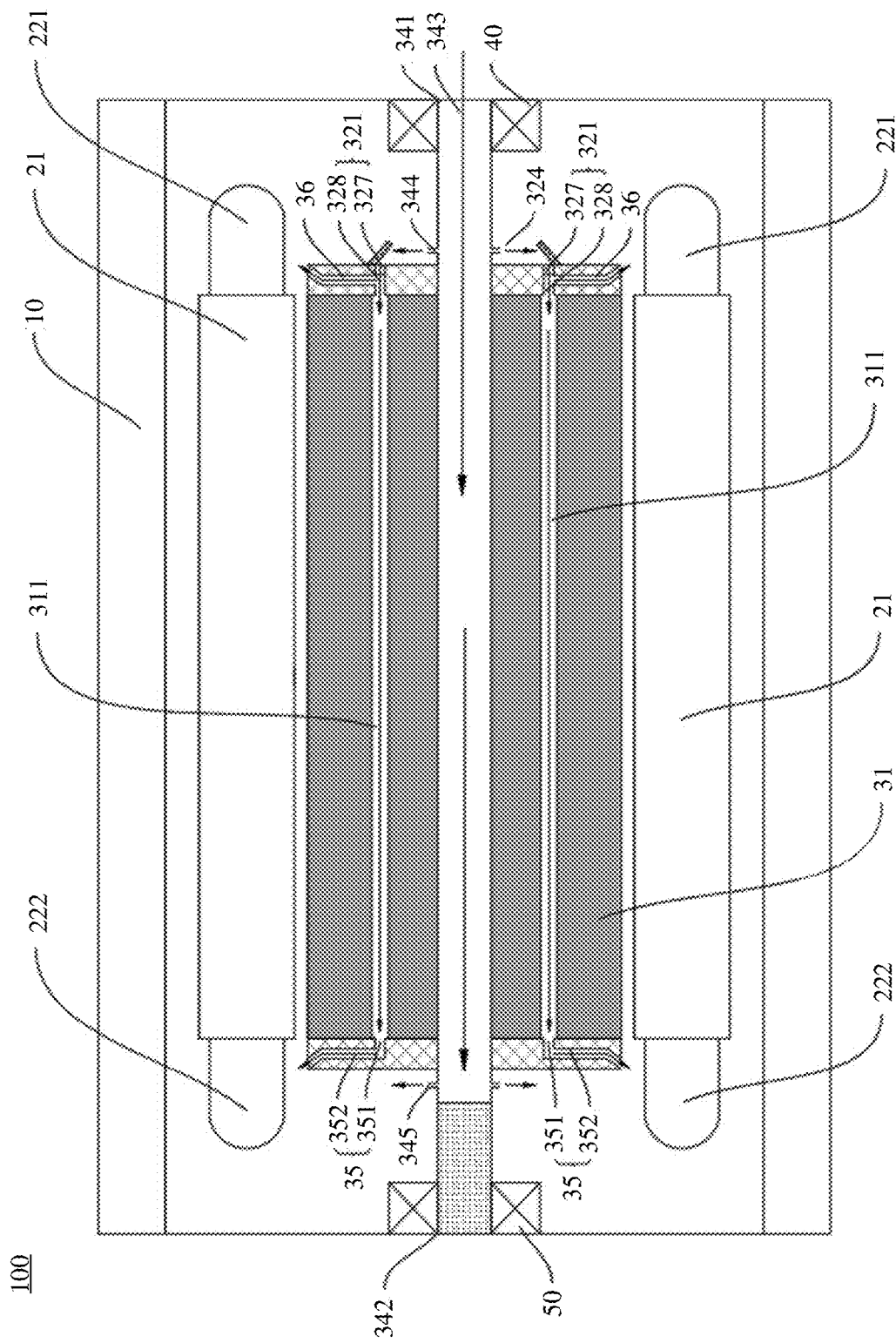
FIG. 18 is a schematic diagram of a structure of a motor according to a sixth embodiment.

Referring to FIG. 18, a sixth embodiment is different from the foregoing first embodiment in that the first end 341 of the rotating shaft 34 is provided with a blind hole 343 that extends to the second end 342 for the coolant to flow in. In other words, the coolant can flow in from the first end 341 of the rotating shaft 34. The first end 341 is provided with a first liquid spraying port 344 connected to the blind hole 343. The first liquid spraying port 344 is located inside the liquid collection groove 324, and the first liquid spraying port 344 is configured to spray the coolant flowing into the blind hole 343 out to the liquid collection groove 324. The second end 342 is provided with a second liquid spraying port 345 connected to the blind hole 343. The second liquid spraying port 345 is located outside the second end cover 33, and the second liquid spraying port 345 is configured to spray the coolant flowing into the blind hole 343 out to the second end winding 222.

It can be understood that, in a rotation process of the rotor 30, under an effect of the centrifugal force, the coolant in the blind hole 343 is sprayed out from the first liquid spraying port 344 and flows into the liquid collection groove 324 and is sprayed out from the second liquid spraying port 345 to the second end winding 222. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving the production efficiency of the motor 100.

In this embodiment, the blind hole 343, the first liquid spraying port 344, the second liquid spraying port 345, the liquid collection groove 324, the first liquid inlet channel 327, the second liquid inlet channel 328, the liquid flow channel 311, the liquid spraying channel 36, the first liquid outlet channel 351, and the second liquid outlet channel 352 together form the rotor 30 channel for the coolant. A direction shown by an arrow in FIG. 18 is a flow direction of the coolant.

The rotor 30 channel in this embodiment may enable the coolant to flow into the rotating shaft 34 through the blind hole 343 disposed at the first end 341 of the rotating shaft 34. For the coolant flowing into the rotating shaft 34, one part of the coolant is sprayed into the liquid collection groove 324 from the first liquid spraying port 344 disposed at the first end 341 of the rotating shaft 34. The other part of the coolant is sprayed to the second end winding 222 from the second liquid spraying port 345 disposed at the second end 342 of the rotating shaft 34. After entering the liquid collection groove 324, the coolant entering the liquid collection groove 324 flows into the second liquid inlet channel 328 through the first liquid inlet channel 327. For the coolant entering the second liquid inlet channel 328, one part of the coolant enters the liquid spraying channel 36 and is sprayed to the first end winding 221 from the outlet of the liquid spraying channel 36. The other part of the coolant sequentially enters the liquid flow channel 311 and the first liquid outlet channel 351, then enters the second liquid outlet channel 352, and is sprayed to the second end winding 222 from an outlet of the second liquid outlet channel 352.

Therefore, the disposition of the second liquid spraying port 345 can further coordinate with the second liquid outlet channel 352 to perform cooling and heat dissipation for the second end winding 222, thereby further improving a heat dissipation effect of the second end winding 222. The rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 19:
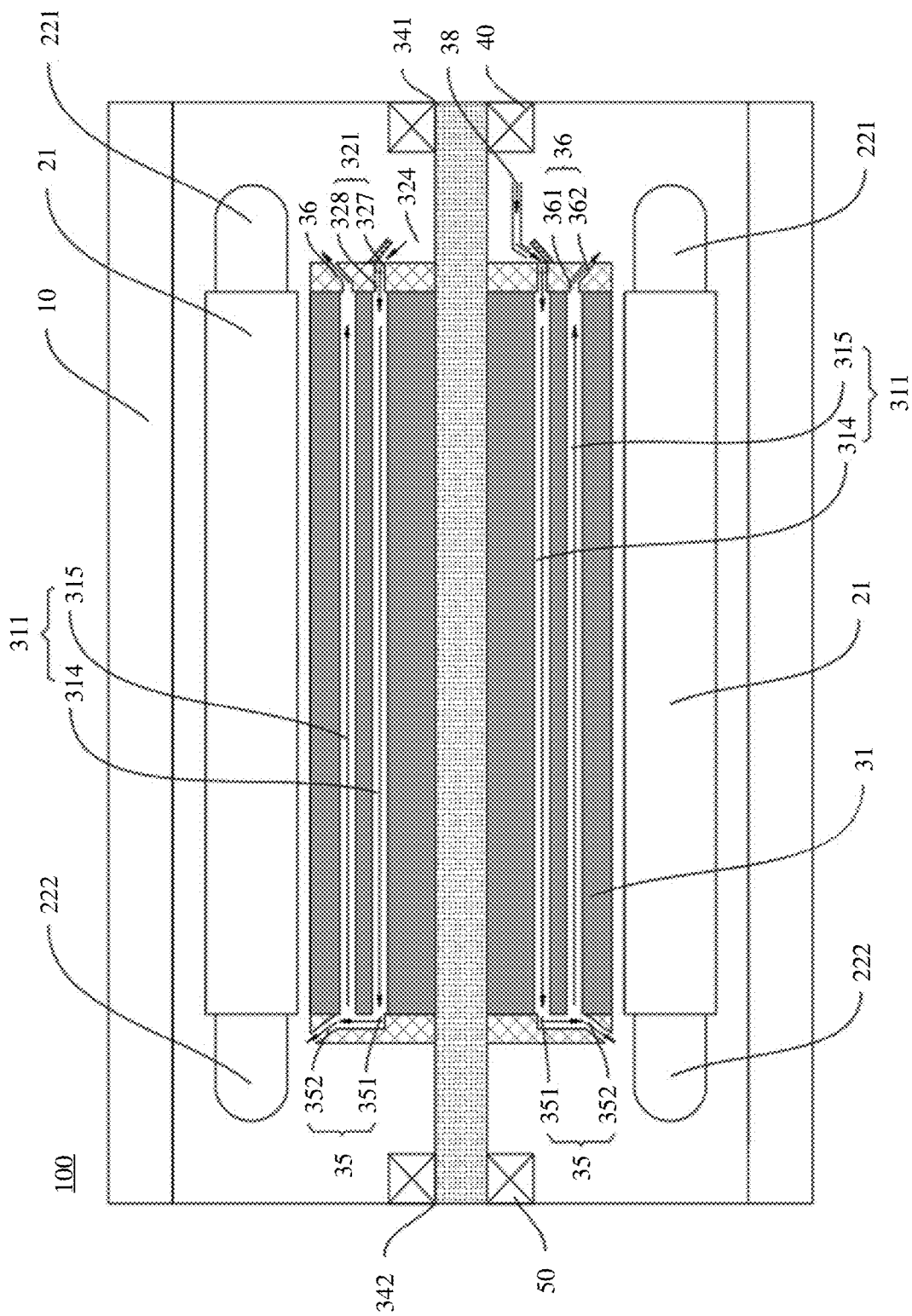
FIG. 19 is a schematic diagram of a structure of a motor according to a seventh embodiment.
Figure 20:
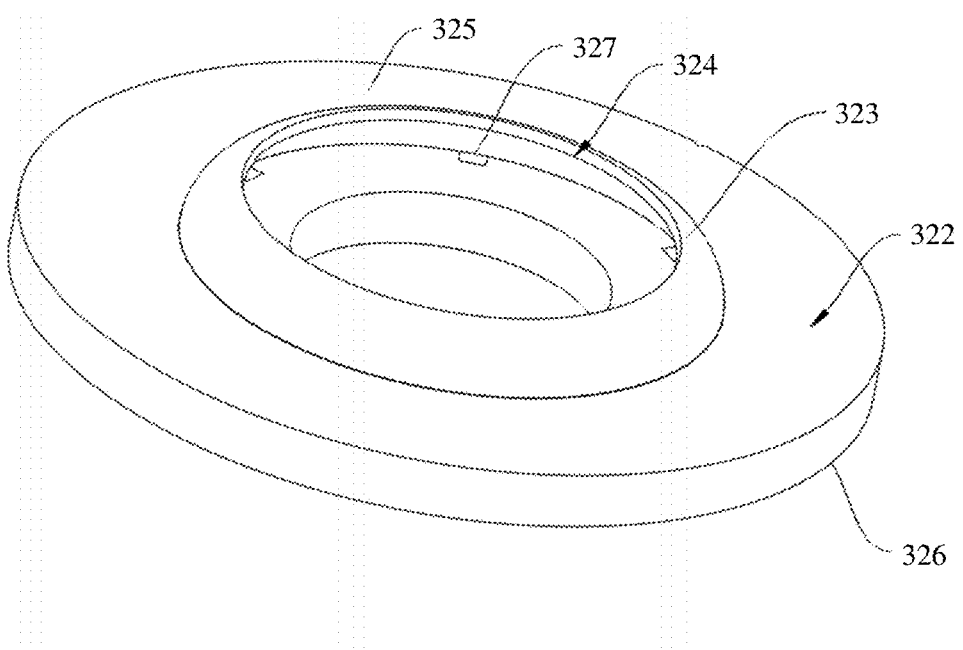
FIG. 20 is a schematic diagram of a structure of a first end cover of a motor.

Referring to FIG. 19 and FIG. 20, a seventh embodiment is different from the foregoing third embodiment in that each liquid flow channel 311 includes a first liquid flow channel 314 and a second liquid flow channel 315. The first liquid flow channel 314 connects the liquid inlet channel 321 and the liquid outlet channel 35, and the second liquid flow channel 315 connects the liquid outlet channel 35 and the liquid spraying channel 36. The first liquid flow channel 314 connects the second liquid inlet channel 328 and the first liquid outlet channel 351, and the second liquid flow channel 315 connects the first liquid outlet channel 351 and the liquid spraying channel 36. In other words, the inlet of the liquid spraying channel 36 is connected to the second liquid flow channel 315 instead of the second liquid inlet channel 328. Therefore, each liquid flow channel inside the rotor iron core 31 may be provided with two layers of liquid flow channels (the first liquid flow channel 314 and the second liquid flow channel 315). This helps improve cooling performance of the rotor iron core and ensure heat dissipation reliability of the rotor iron core.

In this embodiment, the liquid spraying channel 36 includes a first liquid spraying channel 361 and a second liquid spraying channel 362 that are connected to each other. The first liquid spraying channel 361 is annular and is connected to the second liquid flow channel 315, the second liquid spraying channel 362 connects the first liquid spraying channel 361 and the space outside the rotor 30, and an outlet of the second liquid spraying channel 362 faces the second end winding 222. The outlet of the second liquid spraying channel 362 may be the outlet of the liquid spraying channel 36 described above.

It can be understood that, the first liquid spraying channel 361 may be formed by a depression on the second surface 326 of the first end cover 32, and the first liquid spraying channel 361 is annular, so that when the coolant flows into the first liquid spraying channel 361 through a plurality of first liquid flow channels 314, the coolant can be evenly distributed in the circumferential direction of the first end cover 32. In other words, the first liquid spraying channel 361 has a flow equalization function and can evenly distribute, to the circumferential direction of the first end cover 32, the coolant flowing through a plurality of second liquid flow channels 315. This is conducive to subsequent spraying of the coolant from the first end cover 32.

In this embodiment, an example in which there are two second liquid spraying channels 362 is used for description, and the two second liquid spraying channels 362 are symmetrically disposed on the first end cover 32. The symmetrical disposition helps ensure dynamic balance of the rotor 30. Additionally, in other embodiments, a quantity of second liquid outlet channels 352 may be four, six, or the like, which is not limited.

An extension direction of each second liquid spraying channel 362 intersects an extension direction of the first end winding 221, so that an included angle is present between the extension direction of the second liquid spraying channel 362 and the extension direction of the first end winding 221. For example, the included angle may be 40°, 45°, or 50°, which is not limited. The disposition enables as much of the coolant as possible to be sprayed to the first end winding 221 while staying away from the stator iron core 21 when the coolant is sprayed out from the second liquid spraying channel 362 under a rotational action of the rotor 30, thereby preventing the coolant from being sprayed to the stator iron core 21 and adversely affecting the stator 20. In a possible implementation, a cross-sectional shape of each second liquid spraying channel 362 may be presented as a straight-line shape shown in FIG. 19, or the cross-sectional shape of each second liquid spraying channel 362 may be presented as an arc shape. The cross section is a plane formed by cutting the first end cover 32 along a direction in which the central axis of the first end cover 32 is located.

In this embodiment, the liquid collection groove 324, the first liquid inlet channel 327, the second liquid inlet channel 328, the first liquid flow channel 314, the first liquid outlet channel 351, the second liquid outlet channel 352, the second liquid flow channel 315, the first liquid spraying channel 361, and the second liquid spraying channel 362 together form the rotor 30 channel for the coolant. A direction shown by an arrow in FIG. 19 is a flow direction of the coolant.

The rotor 30 channel in this embodiment may enable the coolant to flow into the liquid collection groove 324 through a liquid guide tube 38 disposed in the liquid collection groove 324, and then enter the first liquid outlet channel 351 sequentially through the first liquid inlet channel 327, the second liquid inlet channel 328, and the first liquid flow channel 314 after entering the liquid collection groove 324. For the coolant entering the first liquid outlet channel 351, one part of the coolant enters the second liquid flow channel 315, then enters the second liquid spraying channel 362 sequentially through the second liquid flow channel 315 and the first liquid spraying channel 361 and is sprayed to the first end winding 221 from an outlet of the second liquid spraying channel 362. The other part of the coolant directly enters the second liquid outlet channel 352 and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 21:
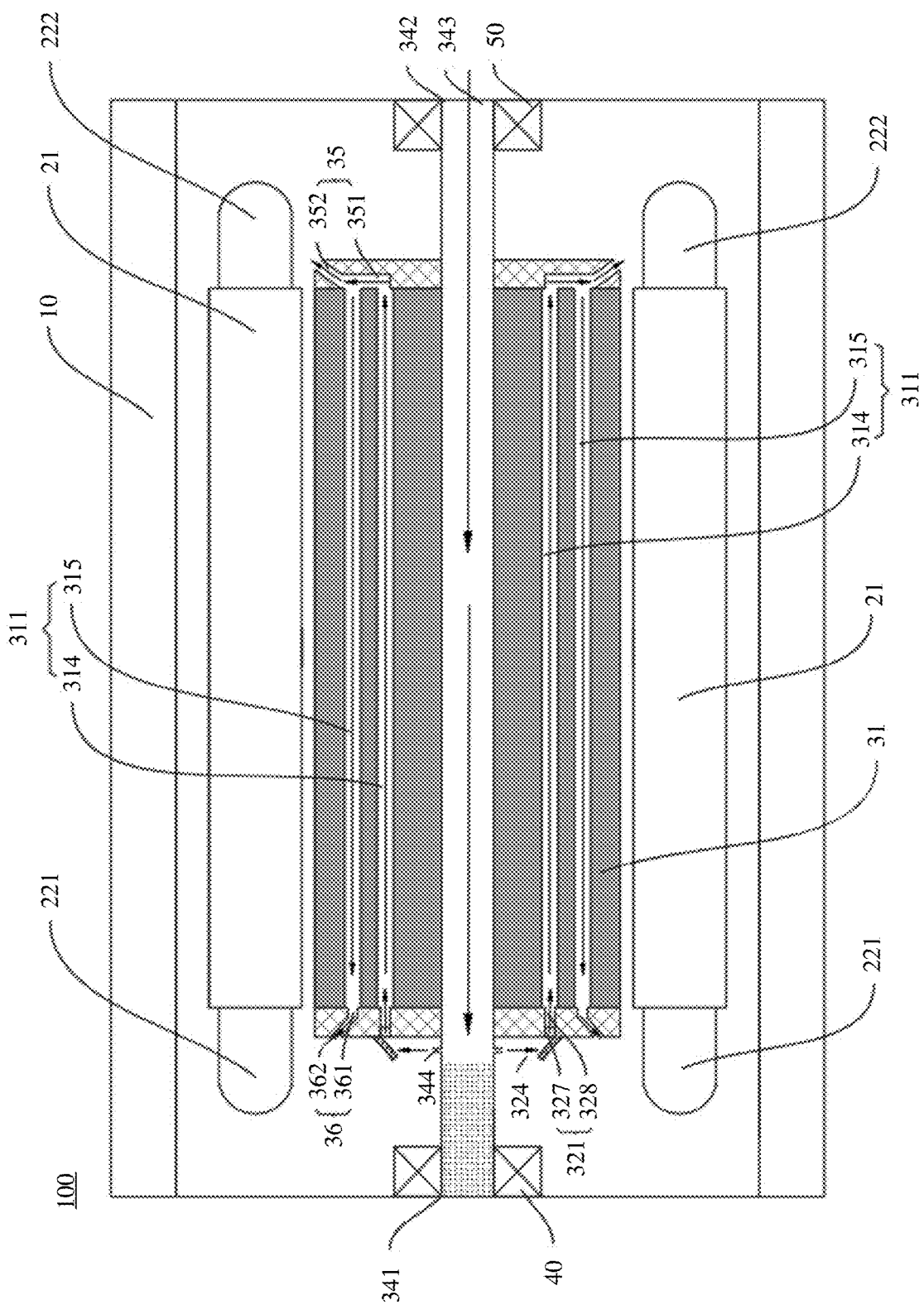
FIG. 21 is a schematic diagram of a structure of a motor according to an eighth embodiment.

Referring to FIG. 21, an eighth embodiment is different from the foregoing seventh embodiment in that the coolant does not enter the liquid collection groove 324 from a liquid guide tube 38 but is introduced into the rotating shaft 34 so that the coolant enters the liquid collection groove 324 through the rotating shaft 34. In other words, the rotating shaft 34 may be disposed as a half-blocked structure to adapt to a structure in which a liquid flows through the shaft.

The second end 342 of the rotating shaft 34 is provided with a blind hole 343 extending to the first end 341 for the coolant to flow in. The blind hole 343 may be connected to a housing channel through a flow guide tube (not shown in the figure). In this way, the coolant entering the motor 100 through the housing channel can flow into the blind hole 343 under a guiding action of the flow guide tube, thereby implementing inner-shaft flowing of the rotating shaft 34. In other words, the coolant can flow in from the second end 342 of the rotating shaft 34. The first end 341 of the rotating shaft 34 is provided with a first liquid spraying port 344 connected to the blind hole 343. The first liquid spraying port 344 is located inside the liquid collection groove 324, and the first liquid spraying port 344 is configured to spray the coolant flowing into the blind hole 343 out to the liquid collection groove 324.

It can be understood that, in a rotation process of the rotor 30, under an effect of the centrifugal force, the coolant in the blind hole 343 is sprayed out from the first liquid spraying port 344 and flows into the liquid collection groove 324. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving the production efficiency of the motor 100.

It should be noted that, a structure of the first liquid spraying port 344 in FIG. 21 is merely for an illustrative purpose and does not represent an actual structural form thereof. The structure may be a hole-like structure that runs through the shaft wall of the rotating shaft 34 and is connected to the blind hole 343. A diameter of the first liquid spraying port 344 may be set according to an actual requirement, provided that the coolant sprayed from the first liquid spraying port 344 can be sprayed into the liquid collection groove 324 without splashing outside the liquid collection groove 324. This is not limited. In addition, a quantity of first liquid spraying ports 344 may also be set according to an actual requirement, provided that better dynamic balance of the rotor 30 can be achieved as far as possible while it is ensured that the coolant is sprayed into the liquid collection groove 324. For example, there may be two first liquid spraying ports 344, and the two first liquid spraying ports 344 are symmetrically disposed at the first end 341 of the rotating shaft 34.

In this embodiment, the blind hole 343, the first liquid spraying port 344, the liquid collection groove 324, the first liquid inlet channel 327, the second liquid inlet channel 328, the first liquid flow channel 314, the first liquid outlet channel 351, the second liquid outlet channel 352, the second liquid flow channel 315, the first liquid spraying channel 361, and the second liquid spraying channel 362 together form the rotor 30 channel for the coolant. A direction shown by an arrow in FIG. 21 is a flow direction of the coolant.

The rotor 30 channel in this embodiment may enable the coolant to flow into the rotating shaft 34 through the blind hole 343 disposed at the second end 342 of the rotating shaft 34 and be sprayed into the liquid collection groove 324 from the first liquid spraying port 344 disposed at the first end 341 of the rotating shaft 34. After entering the liquid collection groove 324, the coolant enters the first liquid outlet channel 351 sequentially through the first liquid inlet channel 327, the second liquid inlet channel 328, and the first liquid flow channel 314. For the coolant entering the first liquid outlet channel 351, one part of the coolant enters the second liquid flow channel 315, then flows into the second liquid spraying channel 362 sequentially through the second liquid flow channel 315 and the first liquid spraying channel 361, and is sprayed to the first end winding 221 from an outlet of the second liquid spraying channel 362 after entering the second liquid spraying channel 362. The other part of the coolant enters the second liquid outlet channel 352 and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 22:
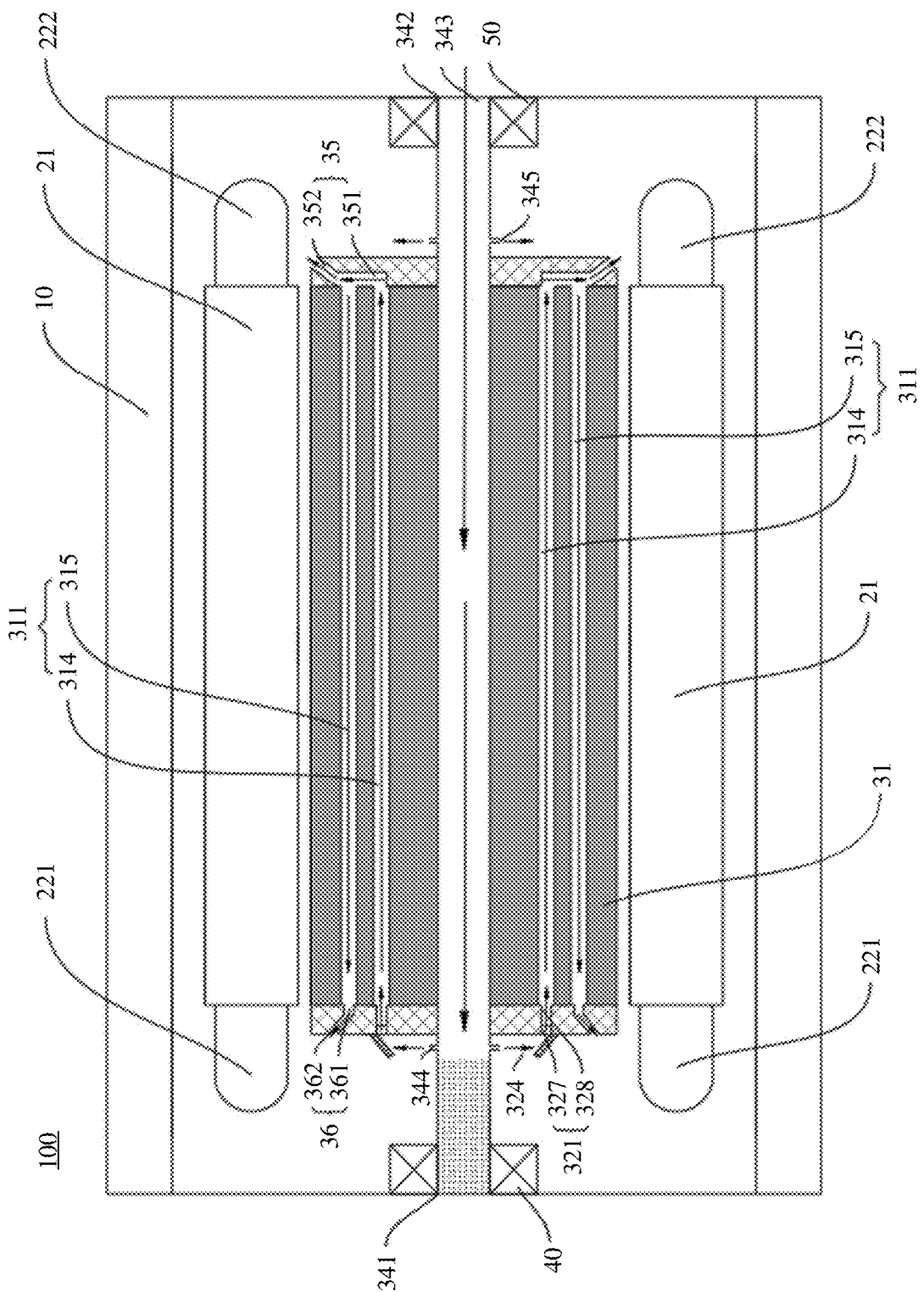
FIG. 22 is a schematic diagram of a structure of a motor according to a ninth embodiment.

Referring to FIG. 22, a ninth embodiment is different from the foregoing eighth embodiment in that the second end 342 of the rotating shaft 34 is further provided with a second liquid spraying port 345 connected to a blind hole 343. The second liquid spraying port 345 is located outside the second end cover 33, and the second liquid spraying port 345 is configured to spray the coolant flowing into the blind hole 343 out to the second end winding 222. In a rotation process of the rotor 30, under an effect of the centrifugal force, the coolant in the blind hole 343 is sprayed out from the second liquid spraying port 345 to the second end winding 222, to perform heat dissipation and cooling for the second end winding 222.

It should be noted that, a structure of the second liquid spraying port 345 in FIG. 22 is merely for an illustrative purpose and does not represent an actual structural form thereof. The structure may be a hole-like structure that runs through the shaft wall of the rotating shaft 34 and is connected to the blind hole 343. A diameter of the second liquid spraying port 345 may be set according to an actual requirement, provided that the coolant sprayed from the second liquid spraying port 345 can be sprayed to the second end winding 222. This is not limited. In addition, a quantity of second liquid spraying ports 345 may also be set according to an actual requirement, provided that better dynamic balance of the rotor 30 can be achieved as far as possible while it is ensured that the coolant is sprayed to the second end winding 222. For example, there may be two second liquid spraying ports 345, and the two second liquid spraying ports 345 are symmetrically disposed at the second end 342 of the rotating shaft 34.

In this embodiment, the blind hole 343, the second liquid spraying port 345, the first liquid spraying port 344, the liquid collection groove 324, the first liquid inlet channel 327, the second liquid inlet channel 328, the first liquid flow channel 314, the first liquid outlet channel 351, the second liquid outlet channel 352, the second liquid flow channel 315, the first liquid spraying channel 361, and the second liquid spraying channel 362 together form the rotor 30 channel for the coolant. A direction shown by an arrow in FIG. 22 is a flow direction of the coolant.

The rotor 30 channel in this embodiment may enable the coolant to flow into the rotating shaft 34 through the blind hole 343 disposed at the second end 342 of the rotating shaft 34. For the coolant flowing into the rotating shaft 34, one part of the coolant is sprayed to the second end winding 222 from the second liquid spraying port 345 disposed at the second end 342. The other part of the coolant is sprayed into the liquid collection groove 324 from the first liquid spraying port 344 disposed at the first end 341 of the rotating shaft 34, and then enters the first liquid outlet channel 351 sequentially through the first liquid inlet channel 327, the second liquid inlet channel 328, and the first liquid flow channel 314 after entering the liquid collection groove 324. For the coolant entering the first liquid outlet channel 351, one part of the coolant enters the second liquid flow channel 315, then flows into the second liquid spraying channel 362 sequentially through the second liquid flow channel 315 and the first liquid spraying channel 361, and is sprayed to the first end winding 221 from an outlet of the second liquid spraying channel 362 after entering the second liquid spraying channel 362. The other part of the coolant enters the second liquid outlet channel 352 and is sprayed to the second end winding 222 from an outlet of the second liquid outlet channel 352.

Therefore, the disposition of the second liquid spraying port 345 can further coordinate with the second liquid outlet channel 352 to perform cooling and heat dissipation for the second end winding 222, thereby further improving a heat dissipation effect of the second end winding 222. The rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 23:
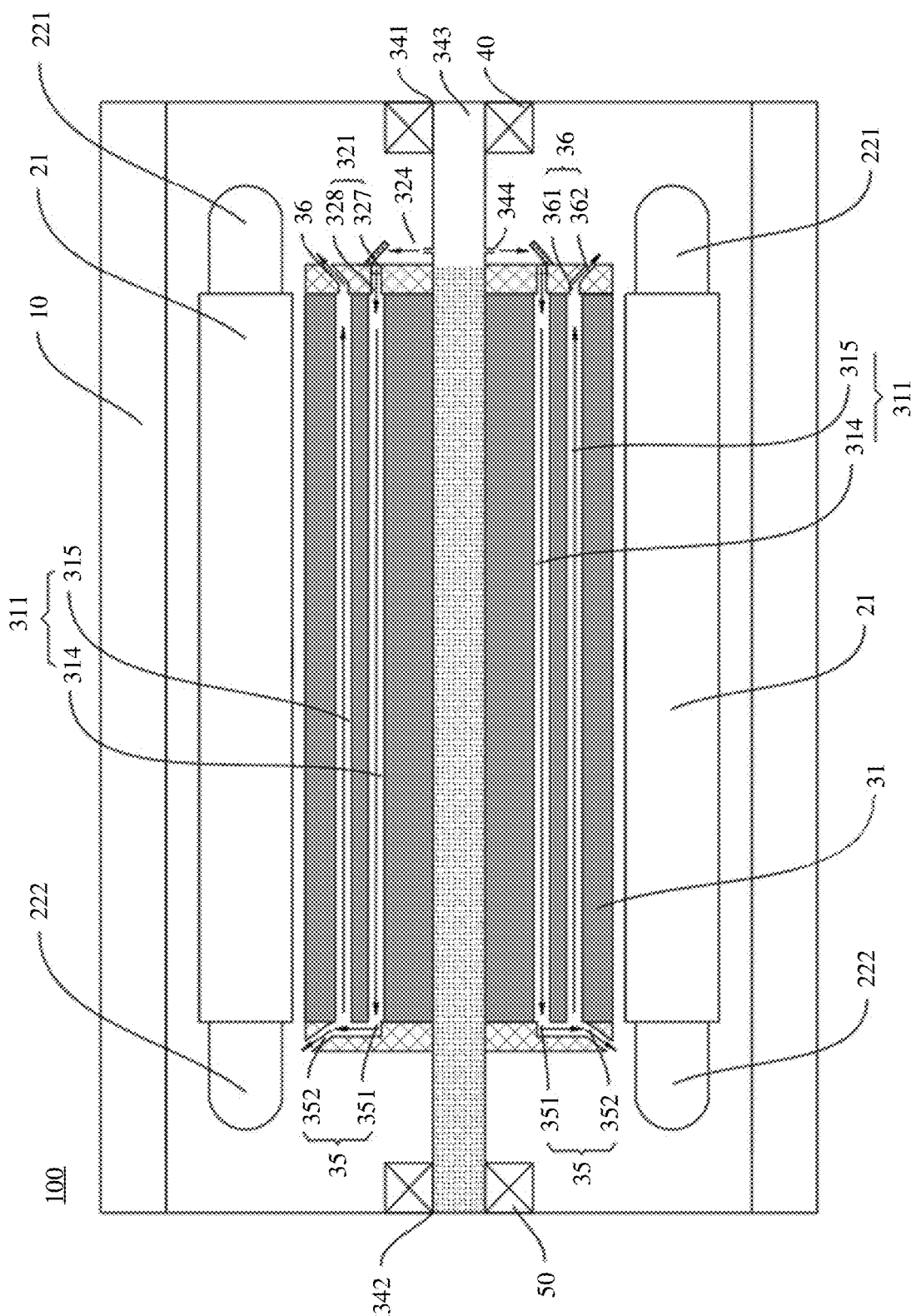
FIG. 23 is a schematic diagram of a structure of a motor according to a tenth embodiment.

Referring to FIG. 23, a tenth embodiment is different from the foregoing eighth embodiment in that the first end 341 of the rotating shaft 34 is provided with a blind hole 343 for the coolant to flow in and a first liquid spraying port 344 connected to the blind hole 343. The blind hole 343 may be connected to a housing channel (not shown in the figure) of the motor housing 10 through a flow guide tube (not shown in the figure). In this way, the coolant entering the motor 100 through the housing channel can flow into the blind hole 343 under a guiding action of the flow guide tube, thereby implementing inner-shaft flowing of the rotating shaft 34. In other words, the coolant can flow in from the first end 341 of the rotating shaft 34. The first liquid spraying port 344 is located inside the liquid collection groove 324, and the first liquid spraying port 344 is configured to spray the coolant flowing into the blind hole 343 out to the liquid collection groove 324.

It can be understood that, in a rotation process of the rotor 30, under an effect of the centrifugal force, the coolant in the blind hole 343 is sprayed out from the first liquid spraying port 344 and flows into the liquid collection groove 324. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving the production efficiency of the motor 100.

In this embodiment, the blind hole 343, the first liquid spraying port 344, the liquid collection groove 324, the first liquid inlet channel 327, the second liquid inlet channel 328, the first liquid flow channel 314, the first liquid outlet channel 351, the second liquid outlet channel 352, the second liquid flow channel 315, the first liquid spraying channel 361, and the second liquid spraying channel 362 together form the rotor 30 channel for the coolant. A direction shown by an arrow in FIG. 23 is a flow direction of the coolant.

The rotor 30 channel in this embodiment may enable the coolant to flow into the rotating shaft 34 through the blind hole 343 disposed at the first end 341 of the rotating shaft 34 and be sprayed into the liquid collection groove 324 from the first liquid spraying port 344 disposed at the first end 341 of the rotating shaft 34. After entering the liquid collection groove 324, the coolant enters the first liquid outlet channel 351 sequentially through the first liquid inlet channel 327, the second liquid inlet channel 328, and the first liquid flow channel 314. For the coolant entering the first liquid outlet channel 351, one part of the coolant enters the second liquid flow channel 315, then flows into the second liquid spraying channel 362 sequentially through the second liquid flow channel 315 and the first liquid spraying channel 361, and is sprayed to the first end winding 221 from an outlet of the second liquid spraying channel 362 after entering the second liquid spraying channel 362. The other part of the coolant enters the second liquid outlet channel 352 and is sprayed to the second end winding 222 from an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 24:
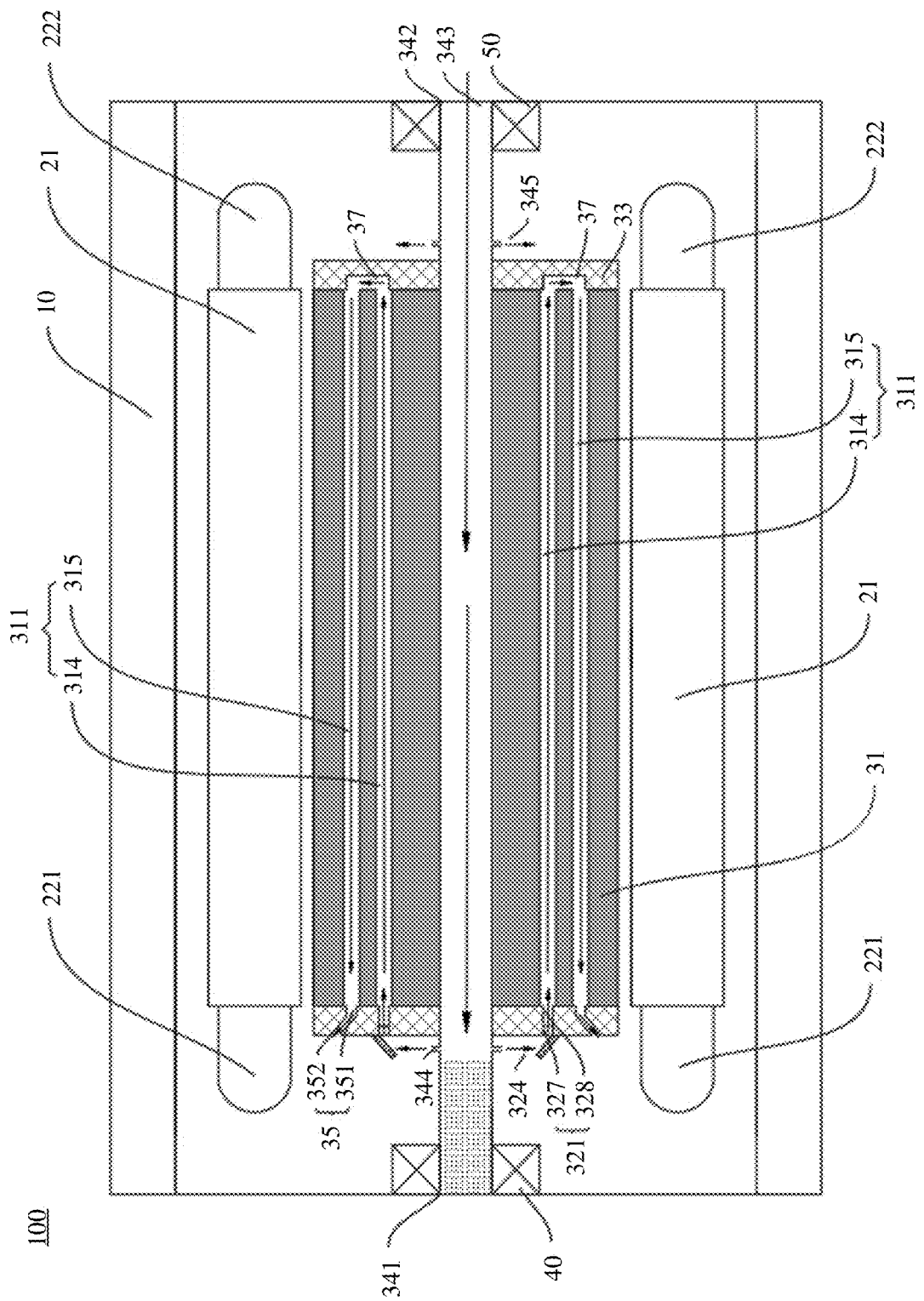
FIG. 24 is a schematic diagram of a structure of a motor according to an eleventh embodiment.

Referring to FIG. 20 and FIG. 24, an eleventh embodiment is different from the foregoing ninth embodiment in that the rotor 30 channel is not provided with a liquid spraying channel 36, the liquid outlet channel 35 is located at the first end cover 32, and the outlet of the liquid outlet channel 35 faces the first end winding 221. It can be understood that, in this embodiment, the second liquid spraying port 345 configured to spray the coolant flowing into a blind hole 343 out to the second end winding 222 is the foregoing outlet added for the coolant.

As shown in FIG. 24, the rotor 30 channel further includes a connecting channel 37, the connecting channel 37 is disposed on the second end cover 33, the first liquid flow channel 314 connects the liquid inlet channel 321 and the connecting channel 37, and the second liquid flow channel 315 connects the connecting channel 37 and the liquid outlet channel 35. The first liquid flow channel 314 connects the second liquid inlet channel 328 and the connecting channel 37, and the second liquid flow channel 315 connects the connecting channel 37 and the liquid outlet channel 35. In other words, the inlet of the liquid outlet channel 35 is connected to the second liquid flow channel 315 instead of the first liquid flow channel 314.

The connecting channel 37 may be formed by a depression on a surface that is of the second end cover 33 and that is close to the rotor iron core 31, and the connecting channel 37 is annular, so that when the coolant flows into the connecting channel 37 through a plurality of first liquid flow channels 314, the coolant can be evenly distributed in a circumferential direction of the second end cover 33. In other words, the connecting channel 37 has a flow equalization function and can evenly distribute, to the circumferential direction of the second end cover 33, the coolant flowing through the plurality of first liquid flow channels 314. This is conducive to subsequent flowing of the coolant into a plurality of second liquid flow channels 315.

After flowing into the second liquid flow channel 315 through the connecting channel 37, the coolant flows into the liquid outlet channel 35 connected to the second liquid flow channel 315 and is sprayed to the first end winding 221 from the outlet of the liquid outlet channel 35.

The liquid outlet channel 35 includes a first liquid outlet channel 351 and a second liquid outlet channel 352 that are connected to each other. The first liquid outlet channel 351 is annular and is connected to the liquid flow channel 311, the second liquid outlet channel 352 connects the first liquid outlet channel 351 and the space outside the rotor 30, and an outlet of the second liquid outlet channel 352 faces the second end winding 222. The outlet of the second liquid outlet channel 352 may be the outlet of the liquid outlet channel 35 described above.

The first liquid outlet channel 351 may be formed by a depression on the second surface 326 of the first end cover 32, and the first liquid outlet channel 351 is annular, so that when the coolant flows into the first liquid outlet channel 351 through the plurality of second liquid flow channels 315, the coolant can be evenly distributed in the circumferential direction of the first end cover 32. In other words, the first liquid outlet channel 351 has a flow equalization function and can evenly distribute, to the circumferential direction of the first end cover 32, the coolant flowing through the plurality of first liquid flow channels 314. This is conducive to subsequent spraying of the coolant from the first end cover 32.

In this embodiment, an example in which there are two second liquid outlet channels 352 is used for description, and the two second liquid outlet channels 352 are symmetrically disposed on the second end cover 33. The symmetrical disposition helps ensure dynamic balance of the rotor 30. In other embodiments, a quantity of second liquid outlet channels 352 may be four, six, or the like, which is not limited.

An extension direction of each second liquid outlet channel 352 intersects an extension direction of the second end winding 222, so that an included angle is present between the extension direction of the second liquid outlet channel 352 and the extension direction of the second end winding 222. For example, the included angle may be 40°, 45°, or 50°, which is not limited. The disposition enables as much of the coolant as possible to be sprayed to the first end winding 221 while staying away from the stator iron core 21 when the coolant is sprayed out from the second liquid outlet channel 352 under a rotational action of the rotor 30, thereby preventing the coolant from being sprayed to the stator iron core 21 and adversely affecting the stator 20. In a possible implementation, a cross-sectional shape of each second liquid outlet channel 352 may be presented as a straight-line shape shown in FIG. 24, or the cross-sectional shape of each second liquid outlet channel 352 may be presented as an arc shape. The cross section is a plane formed by cutting the first end cover 32 along a direction in which the central axis of the first end cover 32 is located.

In this embodiment, the blind hole 343, the second liquid spraying port 345, the first liquid spraying port 344, the liquid collection groove 324, the first liquid inlet channel 327, the second liquid inlet channel 328, the first liquid flow channel 314, the connecting channel 37, the second liquid flow channel 315, the first liquid outlet channel 351, and the second liquid outlet channel 352 together form the rotor 30 channel for the coolant. A direction shown by an arrow in FIG. 24 is a flow direction of the coolant.

The rotor 30 channel in this embodiment may enable the coolant to flow into the rotating shaft 34 through the blind hole 343 disposed at the second end 342 of the rotating shaft 34. For the coolant flowing into the rotating shaft 34, one part of the coolant is sprayed to the second end winding 222 from the second liquid spraying port 345 disposed at the second end 342. The other part of the coolant is sprayed into the liquid collection groove 324 from the first liquid spraying port 344 disposed at the first end 341 of the rotating shaft 34, then enters the second liquid outlet channel 352 sequentially through the first liquid inlet channel 327, the second liquid inlet channel 328, the first liquid flow channel 314, the connecting channel 37, the second liquid flow channel 315, and the first liquid outlet channel 351 after entering the liquid collection groove 324, and is sprayed to the first end winding 221 from the outlet of the second liquid outlet channel 352 after entering the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Figure 25:
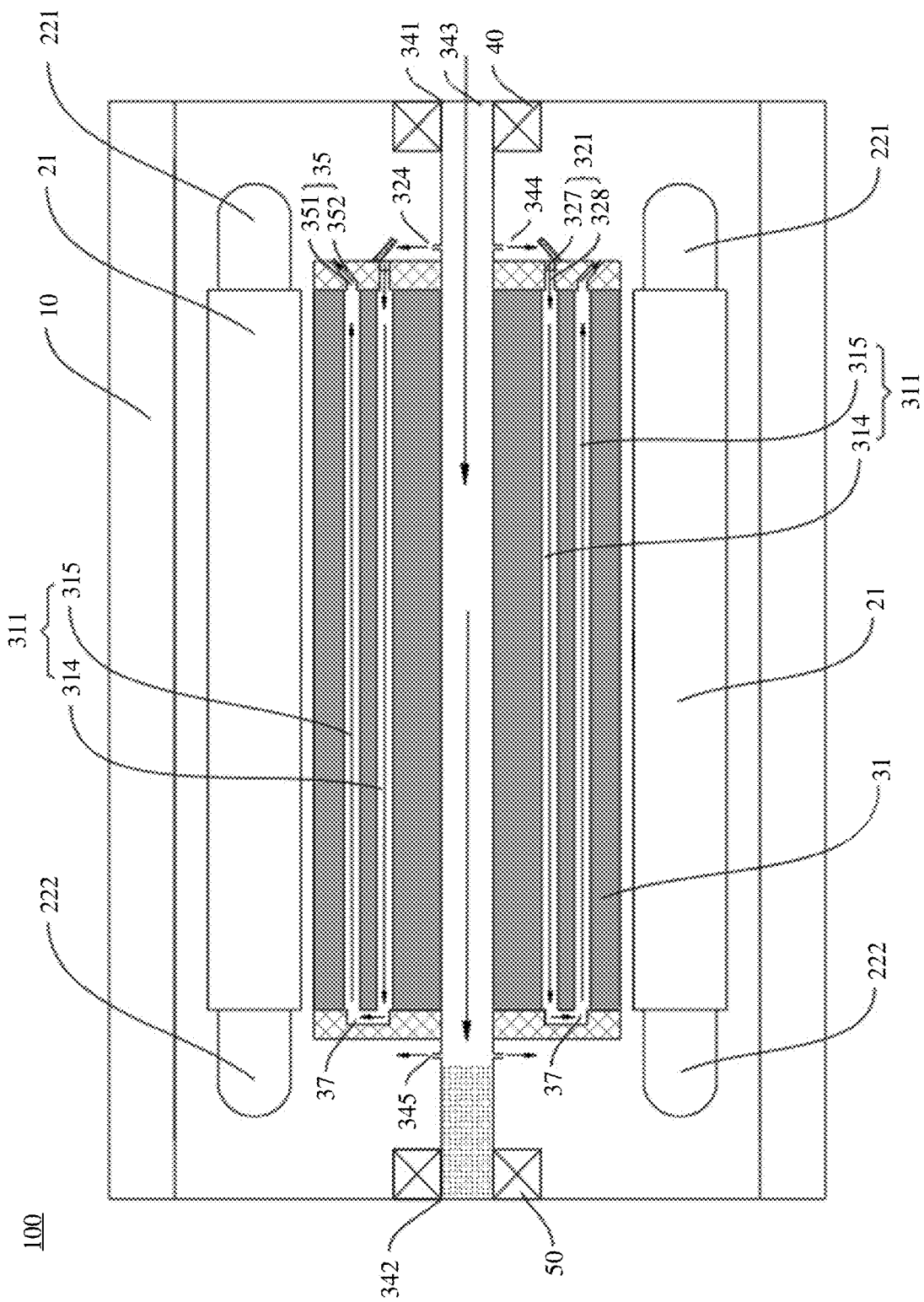
FIG. 25 is a schematic diagram of a structure of a motor according to a twelfth embodiment.

Referring to FIG. 25, a twelfth embodiment is different from the foregoing eleventh embodiment in that the first end 341 of the rotating shaft 34 is provided with a blind hole 343 that extends to the second end 342 for the coolant to flow in. In other words, the coolant can flow in from the first end 341 of the rotating shaft 34. The first end 341 is provided with the first liquid spraying port 344 connected to the blind hole 343. The first liquid spraying port 344 is located inside the liquid collection groove 324, and the first liquid spraying port 344 is configured to spray the coolant flowing into the blind hole 343 out to the liquid collection groove 324. The second end 342 is provided with a second liquid spraying port 345 connected to the blind hole 343. The second liquid spraying port 345 is located outside the second end cover 33, and the second liquid spraying port 345 is configured to spray the coolant flowing into the blind hole 343 out to the second end winding 222.

It can be understood that, in a rotation process of the rotor 30, under an effect of the centrifugal force, the coolant in the blind hole 343 is sprayed out from the first liquid spraying port 344 and flows into the liquid collection groove 324 and is sprayed out from the second liquid spraying port 345 to the second end winding 222. The blind hole 343 is disposed in the rotating shaft 34. In other words, the rotating shaft 34 is disposed as a half-blocked structure. This ensures that the coolant in the blind hole 343 can be sprayed into the liquid collection groove 324 through the first liquid spraying port 344 without special processing on the rotating shaft 34. The disposition simplifies a processing process of the rotating shaft 34, thereby effectively reducing processing costs of the rotating shaft 34 and improving the production efficiency of the motor 100.

In this embodiment, the blind hole 343, the first liquid spraying port 344, the second liquid spraying port 345, the liquid collection groove 324, the first liquid inlet channel 327, the second liquid inlet channel 328, the first liquid flow channel 314, the connecting channel 37, the second liquid flow channel 315, the first liquid spraying channel 361, and the second liquid spraying channel 362 together form the rotor 30 channel for the coolant. A direction shown by an arrow in FIG. 25 is a flow direction of the coolant.

The rotor 30 channel in this embodiment may enable the coolant to flow into the rotating shaft 34 through the blind hole 343 disposed at the first end 341 of the rotating shaft 34. For the coolant flowing into the rotating shaft 34, one part of the coolant is sprayed into the liquid collection groove 324 from the first liquid spraying port 344 disposed at the first end 341 of the rotating shaft 34. The other part of the coolant is sprayed to the second end winding 222 from the second liquid spraying port 345 disposed at the second end 342 of the rotating shaft 34. After entering the liquid collection groove 324, the coolant entering the liquid collection groove 324 enters the second liquid outlet channel 352 sequentially through the first liquid inlet channel 327, the second liquid inlet channel 328, the first liquid flow channel 314, the connecting channel 37, the second liquid flow channel 315, and the first liquid outlet channel 351. The coolant entering the second liquid outlet channel 352 is sprayed to the first end winding 221 through an outlet of the second liquid outlet channel 352.

Therefore, the rotor 30 channel meets heat dissipation requirements of both the first end winding 221 and the second end winding 222, so that the rotor 30 channel can perform heat dissipation and cooling for both the first end winding 221 and the second end winding 222. In addition, because the rotor 30 channel can further perform heat dissipation for the rotor iron core 31 and the heat emitting point in the rotor iron core 31, the rotor 30 channel can meet heat dissipation requirements of both the rotor 30 and the stator 20. This helps diversify use performance of the rotor 30 and ensure high-speed rotation, strong practicability, and a wide application range of the motor 100.

Based on the foregoing embodiments, it should be understood that the first end cover 32 and the second end cover 33 are correspondingly provided with channels with different functional purposes, so that the first end cover 32 and the second end cover 33 not only can fix the rotor iron core 31, but also can implement one or more functions of liquid injection, liquid spraying, and flow guiding, thereby diversifying use performance of the first end cover 32 and the second end cover 33 to achieve strong practicability and a wide application range.

In addition, channels with different functional purposes are correspondingly disposed in each structure of the rotor 30, so that space of the rotor 30 can be fully utilized, and the coolant can generally flow in the first end cover 32, the rotor iron core 31, and the second end cover 33. The layout is proper and facilitates flowing of the coolant.

When the coolant flows out from the liquid outlet channel 35, the heat exchanger 220 may be configured to receive and cool the coolant flowing out from the liquid outlet channel 35. In addition, because the conveyor apparatus 210 is connected to the heat exchanger 220 and the liquid inlet channel 321, the conveyor apparatus 210 can receive the cooled a coolant and convey the cooled a coolant to the liquid inlet channel 321, to drive the coolant to flow in the rotor 30 channel.

Figure 26:
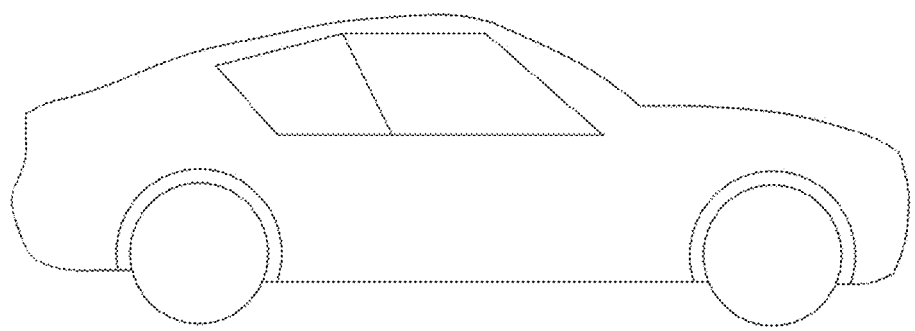
FIG. 26 is a schematic diagram of a structure of an electric vehicle.
Figure 27:
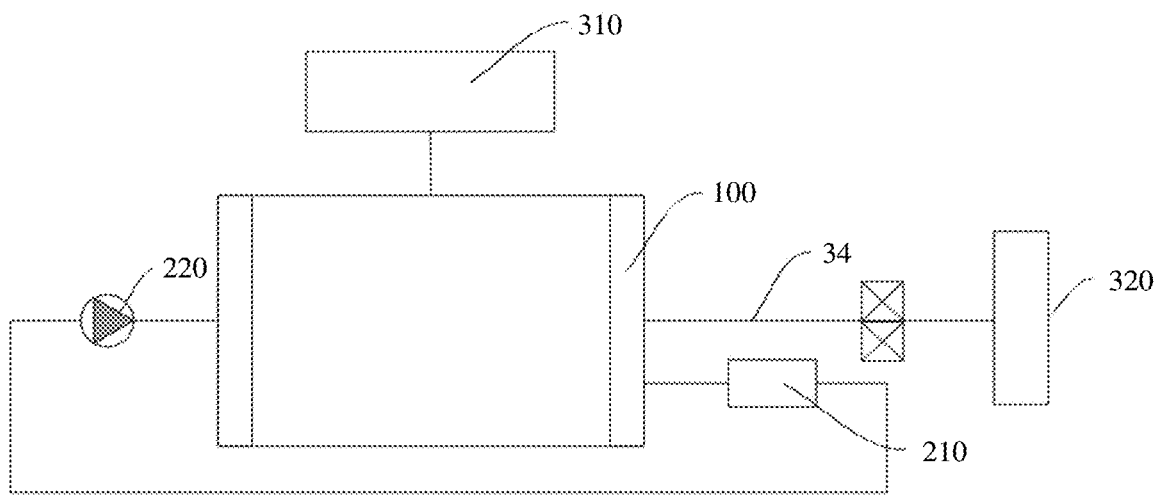
FIG. 27 is a schematic diagram of a connection relationship between a motor cooling system, a speed reducer, and a motor controller of an electric vehicle.

Referring to FIG. 26 and FIG. 27, an embodiment may further provide an electric vehicle 300. The electric vehicle 300 may be, but is not limited to, an electric car, an electric bus, or an electric motorcycle. For example, the electric vehicle 300 may be an electric sport utility vehicle (SUV).

The electric vehicle 300 may include a motor controller 310, a speed reducer 320, and the foregoing motor cooling system 200. The motor controller 310 is connected to the motor 100 to control the motor 100 to work. The speed reducer 320 is connected to a motor 100 shaft of the motor 100 and is configured to transfer a torque output by the motor 100 to another mechanical apparatus. The motor 100 shaft may be the rotating shaft 34 of the rotor 30 of the motor 100. In the electric vehicle 300 according to this embodiment, the rotor iron core 31 and the stator winding 22 of the motor 100 can obtain effective and continuous heat dissipation and deliver high working reliability. Therefore, overall vehicle performance is ensured.

Embodiments are described in detail above. The principles and implementations are described herein through examples. The description about the embodiments is merely provided to help understand. In addition, a person of ordinary skill in the art can make variations and modifications to the embodiments without departing the scope of the embodiments.

What is claimed is:

1. A motor, the motor comprising:
   a rotor, the rotor comprising:
   a rotor iron core provided with a liquid flow channel;
   a first end cover provided with a liquid inlet channel, an end cover body and a retaining wall, the liquid inlet channel is located in the end cover body, the retaining wall is annular and protrudes from a surface that is of the end cover body and that is away from the rotor iron core and forms a liquid collection groove together with the end cover body, the liquid collection groove is connected to the liquid inlet channel, and the liquid collection groove is configured to guide a coolant to flow into the liquid inlet channel;
   a second end cover, the first end cover and the second end cover are respectively connected to two ends of the rotor iron core, the first end cover or the second end cover is provided with a liquid outlet channel, the liquid inlet channel connects the liquid flow channel and space outside the rotor, the liquid outlet channel connects the liquid flow channel and the space outside the rotor, and an outlet of the liquid outlet channel faces a stator winding; and the liquid inlet channel, the liquid flow channel, and the liquid outlet channel form a rotor channel for the coolant to flow through;
   a stator that is sleeved around a periphery of the rotor, the stator comprises a stator winding, an end of the stator winding that is located on a side of the first end cover is a first end winding, and an end of the stator winding that is located on a side of the second end cover is a second end winding; and
   a rotating shaft, the rotor iron core, the first end cover, and the second end cover are all sleeved around the rotating shaft, wherein the rotating shaft includes a first end located on the side of the first end cover; and the first end is provided with a blind hole for the coolant to flow in and a first liquid spraying port connected to the blind hole, the first liquid spraying port is located inside the liquid collection groove, and the first liquid spraying port is configured to spray the coolant flowing into the blind hole out to the liquid collection groove.

2. The motor according to claim 1, wherein an end of the retaining wall that is away from the end cover body extends toward the rotating shaft.

3. The motor according to claim 1, wherein the rotor channel further comprises:
   a liquid spraying channel, wherein the liquid spraying channel is located on the first end cover and connects the liquid inlet channel and the space outside the rotor, and an outlet of the liquid spraying channel faces the first end winding; and the liquid outlet channel is located on the second end cover, and the outlet of the liquid outlet channel faces the second end winding.

4. The motor according to claim 1, wherein the rotor channel further comprises:
   a liquid spraying channel, wherein the liquid spraying channel is located on the first end cover, and an outlet of the liquid spraying channel faces the first end winding; the liquid outlet channel is located on the second end cover, and the outlet of the liquid outlet channel faces the second end winding; and the liquid flow channel comprises:
   a first liquid flow channel and a second liquid flow channel, wherein the first liquid flow channel connects the liquid inlet channel and the liquid outlet channel, and the second liquid flow channel connects the liquid outlet channel and the liquid spraying channel.

5. The motor according to claim 1, wherein the liquid outlet channel is located on the first end cover, and the outlet of the liquid outlet channel faces the first end winding; and the rotor channel further comprises:
a connecting channel, the connecting channel is disposed on the second end cover, and the liquid flow channel comprises:
a first liquid flow channel and a second liquid flow channel, wherein the first liquid flow channel connects the liquid inlet channel and the connecting channel, and the second liquid flow channel connects the connecting channel and the liquid outlet channel.

6. The motor according to claim 3, wherein the rotating shaft further comprises:
a second end located on the side of the second end cover, wherein the blind hole extends to the second end, and the second end is provided with a second liquid spraying port connected to the blind hole, and the second liquid spraying port is configured to spray the coolant flowing into the blind hole out to the second end winding.

7. The motor according to claim 3, wherein the rotating shaft further comprises:
a second end located on the side of the second end cover, wherein the blind hole extends to the second end.

8. The motor according to claim 1, wherein the rotating shaft comprises:
a second liquid spraying port connected to the blind hole, the second liquid spraying port is configured to spray the coolant flowing into the blind hole out to the first end winding, the liquid outlet channel is located on the second end cover, and the outlet of the liquid outlet channel faces the second end winding.

9. The motor according to claim 3, further comprising:
a liquid guide tube extending into the liquid collection groove, an end of the liquid guide tube that extends into the liquid collection groove extends toward the retaining wall, and the liquid guide tube is configured to guide the coolant to flow into the liquid collection groove.

10. The motor according to claim 1, wherein the liquid inlet channel comprises:
a first liquid inlet channel and a second liquid inlet channel that are connected to each other, a plurality of first liquid inlet channels exists, the first liquid inlet channels spaced along a circumferential direction of the first end cover, and the second liquid inlet channel is annular and connects the liquid flow channel and each of the first liquid inlet channels.

11. The motor according to claim 1, wherein a plurality of liquid flow channels exists, and the liquid flow channels are spaced along a circumferential direction of the rotor iron core.

12. A motor cooling system, the motor cooling system comprising:
a heat exchanger,
a conveyor apparatus, and
a motor, wherein the motor comprises:
a rotor, the rotor comprises:
a rotor iron core provided with a liquid flow channel;
a first end cover provided with a liquid inlet channel, an end cover body and a retaining wall, the liquid inlet channel is located in the end cover body, the retaining wall is annular and protrudes from a surface that is of the end cover body and that is away from the rotor iron core and forms a liquid collection groove together with the end cover body, the liquid collection groove is connected to the liquid inlet channel, and the liquid collection groove is configured to guide a coolant to flow into the liquid inlet channel; and
a second end cover, and the first end cover and the second end cover are respectively connected to two ends of the rotor iron core, the first end cover or the second end cover is provided with a liquid outlet channel, the liquid inlet channel connects the liquid flow channel and space outside the rotor, the liquid outlet channel connects the liquid flow channel and the space outside the rotor, and an outlet of the liquid outlet channel faces a stator winding; and the liquid inlet channel, the liquid flow channel, and the liquid outlet channel form a rotor channel for a coolant to flow through; the heat exchanger is configured to receive and cool the coolant flowing out from the liquid outlet channel, and the conveyor apparatus is connected to the heat exchanger and the liquid inlet channel, and is configured to convey the cooled coolant to the liquid inlet channel and drive the coolant to flow through the rotor channel;
a stator that is sleeved around a periphery of the rotor, an end of the stator winding that is located on a side of the first end cover is a first end winding, and an end of the stator winding that is located on a side of the second end cover is a second end winding; and
and
a rotating shaft, the rotor iron core, the first end cover, and the second end cover are all sleeved around the rotating shaft, wherein the rotating shaft includes a first end located on the side of the first end cover; and the first end is provided with a blind hole for the coolant to flow in and a first liquid spraying port connected to the blind hole, the first liquid spraying port is located inside the liquid collection groove, and the first liquid spraying port is configured to spray the coolant flowing into the blind hole out to the liquid collection groove.

13. The motor cooling system according to claim 12, wherein an end of the retaining wall that is away from the end cover body extends toward the rotating shaft.

14. An electric vehicle, the electric vehicle comprising:
a motor controller,
a speed reducer, and
a motor cooling system, wherein the motor cooling system comprises:
a heat exchanger,
a conveyor apparatus, and
a motor, wherein the motor comprises a rotor, the rotor comprises
a rotor iron core provided with a liquid flow channel;
a first end cover provided with a liquid inlet channel, an end cover body and a retaining wall, the liquid inlet channel is located in the end cover body, the retaining wall is annular and protrudes from a surface that is of the end cover body and that is away from the rotor iron core and forms a liquid collection groove together with the end cover body, the liquid collection groove is connected to the liquid inlet channel, and the liquid collection groove is configured to guide a coolant to flow into the liquid inlet channel;

a second end cover, and the first end cover and the second end cover are respectively connected to two ends of the rotor iron core, the first end cover or the second end cover is provided with a liquid outlet channel, the liquid inlet channel connects the liquid flow channel and space outside the rotor, the liquid outlet channel connects the liquid flow channel and the space outside the rotor, and an outlet of the liquid outlet channel faces a stator winding; and the liquid inlet channel, the liquid flow channel, and the liquid outlet channel form a rotor channel for a coolant to flow through; the heat exchanger is configured to receive and cool the coolant flowing out from the liquid outlet channel, and the conveyor apparatus is connected to the heat exchanger and the liquid inlet channel, and is configured to convey the cooled coolant to the liquid inlet channel and drive the coolant to flow through the rotor channel; the motor controller is connected to the motor to control operation of the motor, and the speed reducer is connected to a rotating shaft of the rotor of the motor; and the rotating shaft, the rotor iron core, the first end cover, and the second end cover are all sleeved around the rotating shaft, wherein the rotating shaft includes a first end located on the side of the first end cover; and the first end is provided with a blind hole for the coolant to flow in and a first liquid spraying port connected to the blind hole, the first liquid spraying port is located inside the liquid collection groove, and the first liquid spraying port is configured to spray the coolant flowing into the blind hole out to the liquid collection groove.

15. The electric vehicle according to claim 14, wherein an end of the retaining wall that is away from the end cover body extends toward the rotating shaft.

\* \* \* \* \*